US012719928B2

(12) United States Patent
Charan et al.

(10) Patent No.: US 12,719,928 B2
(45) Date of Patent: Aug. 25, 2026

(54) SYSTEM AND METHOD FOR ADAPTIVE DECEPTION ORCHESTRATION

(71) Applicant: INDIAN INSTITUTE OF TECHNOLOGY KANPUR, Kanpur (IN)

(72) Inventors: Putrevu Venkata Sai Charan, Kanpur (IN); Subhasis Mukhopadhyay, Kanpur (IN); Subhajit Manna, Kanpur (IN); Sandeep Kumar Shukla, Kanpur (IN); Nanda Rani, Kanpur (IN); Ansh Vaid, Kanpur (IN); Chunduri Naga Venkata Hrushikesh, Kanpur (IN); Mohan Anand Putrevu, Kanpur (IN)

(73) Assignee: INDIAN INSTITUTE OF TECHNOLOGY KANPUR (IN)

( * ) Notice: Subject to any disclaimer, the term of this patent is extended or adjusted under 35 U.S.C. 154(b) by 37 days.

(21) Appl. No.: 18/786,811

(22) Filed: Jul. 29, 2024

(65) Prior Publication Data

US 2025/0254196 A1 Aug. 7, 2025

Related U.S. Application Data

(60) Provisional application No. 63/627,859, filed on Feb. 1, 2024.

(51) Int. Cl.
*H04L 9/00* (2022.01)
*H04L 9/40* (2022.01)

(52) U.S. Cl.
CPC ...... *H04L 63/1491* (2013.01); *H04L 63/0272* (2013.01); *H04L 63/1433* (2013.01)

(58) Field of Classification Search
CPC ............ H04L 63/1491; H04L 63/0272; H04L 63/1433
USPC .......................................................... 726/15
See application file for complete search history.

(56) References Cited

U.S. PATENT DOCUMENTS

| | | | | |
|---|---|---|---|---|
| 10,044,675 | B1 * | 8/2018 | Ettema | H04L 63/0227 |
| 2014/0324554 | A1 * | 10/2014 | Chang | G06Q 10/06395 705/7.41 |
| 2021/0194853 | A1 * | 6/2021 | Xiao | H04L 43/028 |

(Continued)

*Primary Examiner* — Christopher J Brown
(74) *Attorney, Agent, or Firm* — Jason C. Cameron

(57) ABSTRACT

The present invention discloses system and method for adaptive deception orchestration is disclosed. The system comprises a dummy asset generation module configured for generating dummy assets upon receipt of defined organizational data from an organization server, a dockerized container creation module configured for generating a plurality of virtual system groups, a virtual private machine client-server communication module configured for establishing a plurality of virtual private networks (VPN) in the plurality of virtual system groups, to provide a secure communication channel, a cyber-attack path orchestration module configured for orchestrating one or more cyber-attack scenario based on a plurality of historical behavioural patterns, an adaptive camouflaging module operatively configured for transferring system logs at a predetermined time interval by masking a chatting application and an intelligence accumulation module operatively connected to the adaptive camouflaging module configured for generating an attack pattern based on the analysis of the system logs.

11 Claims, 26 Drawing Sheets

(56) References Cited

U.S. PATENT DOCUMENTS

2022/0385635 A1* 12/2022 Thimmisetty ....... H04L 63/0263
2022/0417219 A1* 12/2022 Sheriff .................... H04L 67/56

* cited by examiner

| | |
|---|---|
| IP address | 194.87.252.159 (change) |
| Latitude | 55.7483 |
| Longitude | 37.6171 |
| Country | Russia |
| Region | Moscow |
| City | Moscow |
| Organization | Baykov Ilya Sergeevich |

SYSTEM AND METHOD FOR ADAPTIVE DECEPTION ORCHESTRATION

EARLIEST PRIORITY DATE

This application claims priority from a Provisional patent application filed in U.S. having Patent Application No. 63/627,859, filed on Feb. 1, 2024, and titled "SYSTEM AND METHOD FOR ADAPTIVE MASKING-BASED DECEPTION ORCHESTRATION".

FIELD OF INVENTION

Embodiments of the present invention relate to a secured network communication and more particularly to a system and method for adaptive deception orchestration.

BACKGROUND

In response to the rising threat of cyberattacks, especially those by targeted skilled groups, tailored deception has become crucial for improving online security. As cyber attackers become more advanced, deploying honeypots customized to mimic an organization's unique IT and OT infrastructure has become an indispensable tool in understanding and preparing a formidable strategy against them. This involves designing honeypots, these honeypots adapt dynamically, disrupting potential attacks and providing insights into cyber attackers' methods. These proactive approaches protect critical organizational data and aid in investigating cybersecurity breaches.

While honeypots are generally effective, they struggle against advanced cyber attackers like APT actors, who target specific organizations for extended periods. These actors use advanced evasion techniques and are well informed about common honeypot traps, making them difficult to lure and study. This invention emphasizes luring these APT attackers to understand their behavior and improve detection and protection.

Different organizations face varying intensity of cyber threats based on factors like industry, location, customer base, revenue, and national importance. These factors influence deception strategies and tactics used by cyber attackers.

As digital reliance grows, cyber risks across sectors like public, banking, energy, medical, and education increase significantly. Effective cybersecurity measures tailored to the organization is needed to monitor threats and mitigate risks for all types of businesses.

Existing research has predominantly focused on honeypot deployment for various target systems and environments, such as cloud-based, Internet of Things (IoT), or CPS-specific deployments. Additionally, studies have explored the interaction levels of honeypots, categorized as low, medium, and highly interactive. However, the discussed honeypots specifically are not able to actively engage and lure sophisticated APT actors throughout the entire cyber-attack lifecycle. Also, most of these honeypot orchestrations often fail in the creation of realistic and dynamic environments that closely mimic genuine systems, enticing the APT actors to interact without arousing suspicion. Moreover, the sophisticated APT actors can easily detect typical low/high interaction honeypots with background log monitoring, minimizing engagement and preventing the observation of true behavior in controlled environments.

The sophisticated APT actors demonstrate high levels of intelligence and execute targeted cyberattacks based on specific interests, primarily aimed at gathering highly valuable data. Unlike automated bots and script kiddies, sophisticated malicious users do not interact with random (Internet Protocols (IPs) during their operations, making it a challenge for conventional honeypots to attract their attention effectively.

The APT actors possess in-depth knowledge of deception technologies, including honeypots. The APT actors continuously adapt cyber-attack strategies to avoid falling into honeypot traps, rendering conventional approaches less effective. The APT actors can easily detect traditional honeypots with background log monitoring, minimizing engagement and preventing the observation of true behavior in controlled environments.

The traditional honeypots often fall short when it comes to orchestrating the end-to-end cyber kill chain phases of the sophisticated APT actors. This is because the traditional honeypots typically simulate a service or protocol at a superficial level, and as a result, the traditional honeypots lack the contextual information needed to understand the tactics of the advanced malicious users. Moreover, the traditional honeypots have limited ability to convincingly mimic real-world environments due to which malicious users are less likely to deeply engage with such honeypots.

Hence, there is a need for an advanced system and method for adaptive detection orchestration, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the present invention disclosure, a system for adaptive deception orchestration is disclosed. The system comprises a dummy asset generation module configured for generating dummy assets upon receipt of defined organizational data from an organization server, a dockerized container creation module configured for generating a plurality of virtual system groups, a virtual private machine client-server communication module configured for establishing a plurality of virtual private networks in the plurality of virtual system groups to provide a secure communication channel, a cyber attack path orchestration module configured for orchestrating one or more cyber-attack scenarios based on a plurality of historical behaviour patterns; an adaptive camouflaging module operatively configured for transferring system logs at a predetermined time interval by masking a chatting application and an intelligence accumulation module operatively connected to the adaptive camouflaging module configured for generating an attack pattern based on the analysis of the system logs.

In another embodiment, the dockerized container creation module configured for receiving the plurality of defined organizational data from the organization server, generating the plurality of virtual system groups based on the received defined organizational data and masking the machine access control (MAC) address of the generated virtual system groups.

In yet another embodiment, the adaptive camouflaging module further comprises a periodic log transfer module configured to the transfer system logs at a predetermined time interval and a chat transfer module configured to transfer chat interactions data to an external server at the predetermined time interval. In yet another embodiment, the intelligence accumulation module further comprises an analyzing module configured to receive the system logs from the adaptive camouflaging module and analyze the received system logs for threat detection, a log creation module configured to create a log report based on user activities and a correlation mapping module configured to map correlations between system logs, and the detected threat, for generating the attack pattern.

In one aspect, a method for adaptive deception orchestration is disclosed. The method comprising generating, by a dummy asset generation module, dummy assets, upon receipt of defined organizational data from an organization server, generating by a dockerized container creation module, a plurality of virtual system groups, establishing by a virtual private machine client-server communication module, a plurality of virtual private networks (VPN) in the plurality of virtual system groups, to provide a secure communication channel, orchestrating by a cyber-attack path orchestration module, one or more cyber-attack scenario based on a plurality of historical behavioural patterns, transferring by an adaptive camouflaging module, system logs at a predetermined time interval by masking a chatting application and generating by an intelligence accumulation module, an attack pattern detection based on the analysis of the system logs.

In yet another embodiment, generating, by the dockerized container creation module, the plurality of virtual system groups, comprising receiving the defined organizational data from the organization server, generating a plurality of virtual system groups based on the received defined organizational data and masking the machine access control (MAC) address of the established virtual system groups.

In yet another embodiment, transferring, by the adaptive camouflaging module, system logs at the predetermined time interval by masking the chatting subsystem comprises transferring, by a periodic log transfer module, the system logs at a predetermined time interval and transferring the chat interactions to an external server at a predetermined time interval.

In yet another embodiment, generating an attack pattern detection based on analysis of the system logs data further comprises receiving, by an analyzing module, the system logs and chat interactions data from the adaptive camouflaging module, analyzing the received system logs data for threat detection, creating, by a log creation module, log report based on user activities and mapping, by a correlation mapping module, correlations between system logs data and the detected threat, generating the attack pattern.

In another aspect, a non-transitory computer readable storage medium having instructions therein that when executed by a hardware processor, cause the processor to execute operations of generating dummy assets, upon receipt of defined organizational data from an organization server, generating a plurality of virtual system groups, establishing a plurality of virtual private networks (VPN) in the plurality of virtual system groups, to provide a secure communication channel, orchestrating one or more cyber-attack scenario based on a plurality of historical behavioural patterns, transferring system logs at a predetermined time interval by masking a chatting application and generating an attack pattern based on the analysis of the system logs.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
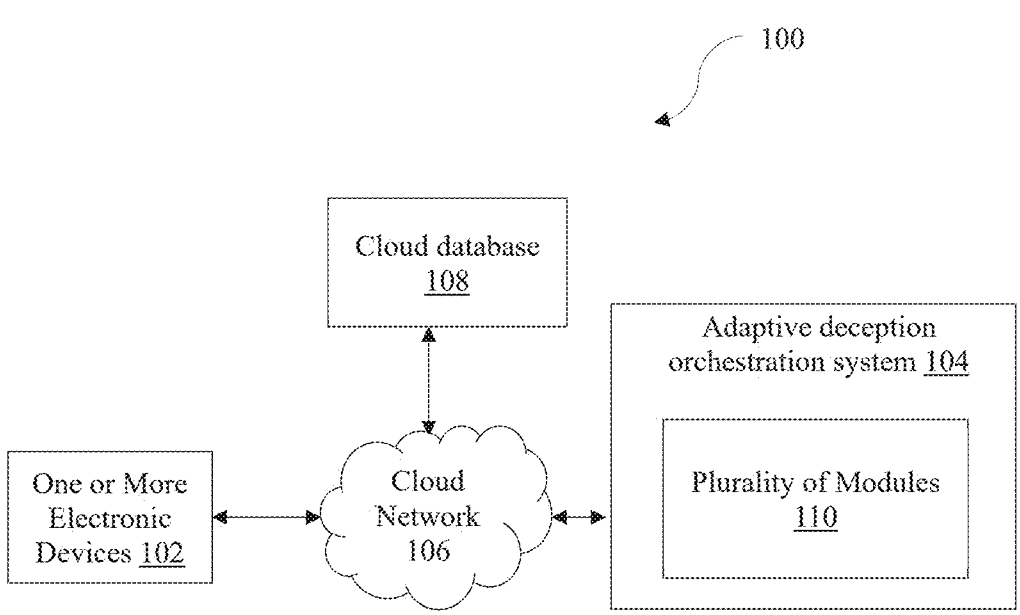
FIG. 1 illustrates a block diagram for an exemplary computing environment for an adaptive deception orchestration system, in accordance with an embodiment of the present invention.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 17, where similar reference characters denote corresponding features consistently throughout the figures, there are shown preferred embodiments, and these embodiments are described in the context of the following exemplary system and/or method.

The present invention describes a novel approach for adaptive deception orchestration. The present invention provides for capturing sensitive information and monitoring cyber-attacker's (referred as "malicious user") behaviour by deploying a camouflaged chatterbox application within the orchestrated honeypot network. The camouflaged chatterbox application provides a conventional chat interface for users while enabling periodic log transfers to track the malicious user's activity effectively.

The present invention focuses on designing a behavioural honeypot network, with a focus on the APT groups by orchestrating strategically positioned cyber-attack paths. The cyber-attack paths are designed based on the Tactics, Technique and Procedure (TTPs) employed by the advanced persistent groups (APT) groups in their previous campaigns covering all the cyber kill chain phases.

FIG. 1 illustrates an exemplary computing environment for an adaptive deception orchestration system, in accordance with an embodiment of the present invention.

According to an embodiment of the present invention, the computing environment 100 comprises an adaptive deception orchestration system 104 and one or more electronic devices 102. The adaptive deception orchestration system 104 is communicatively coupled to the cloud database 108, and the one or more electronic devices 102 via a cloud network 106. The cloud network 106 may include a wired communication network, a wide area network (WAN), a metropolitan area network (MAN), a telephone network such as the public switched telephone network (PSTN) and a cellular network, an intranet, an internet, a fibre optic network, a satellite network, a cloud computing network, and a combination of networks. The cloud network 106 may also include an ethernet using at least one of a transmission control protocol/internet protocol (TCP/IP), a user datagram protocol (UDP), and the like, thereby establishing a connection with the cloud database 108.

The one or more hardware processors 208, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 208 may also include embedded controllers, such as generic or programmable logic devices or arrays, application specific integrated circuits, single-chip computers, and the like.

The memory 202 may be non-transitory volatile memory and non-volatile memory. The memory 202 may be coupled for communication with the one or more hardware processors 208, such as being a computer-readable storage medium. The one or more hardware processors 208 may execute machine-readable instructions and/or source code stored in the memory 202. A variety of machine-readable instructions may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of modules 110 stored in the form of machine-readable instructions on any of the above-mentioned storage media and may be in communication with and executed by the one or more hardware processors 208.

In an exemplary embodiment of the present invention, the one or more electronic devices 102 may include a laptop computer, desktop computer, tablet computer, smartphone, wearable device, a digital camera, and the like. Further, the network 106 may be internet or any other wireless network 106. The adaptive masking-based deception orchestration system 104 may be hosted on a central server, such as cloud server or a remote server.

Figure 2:
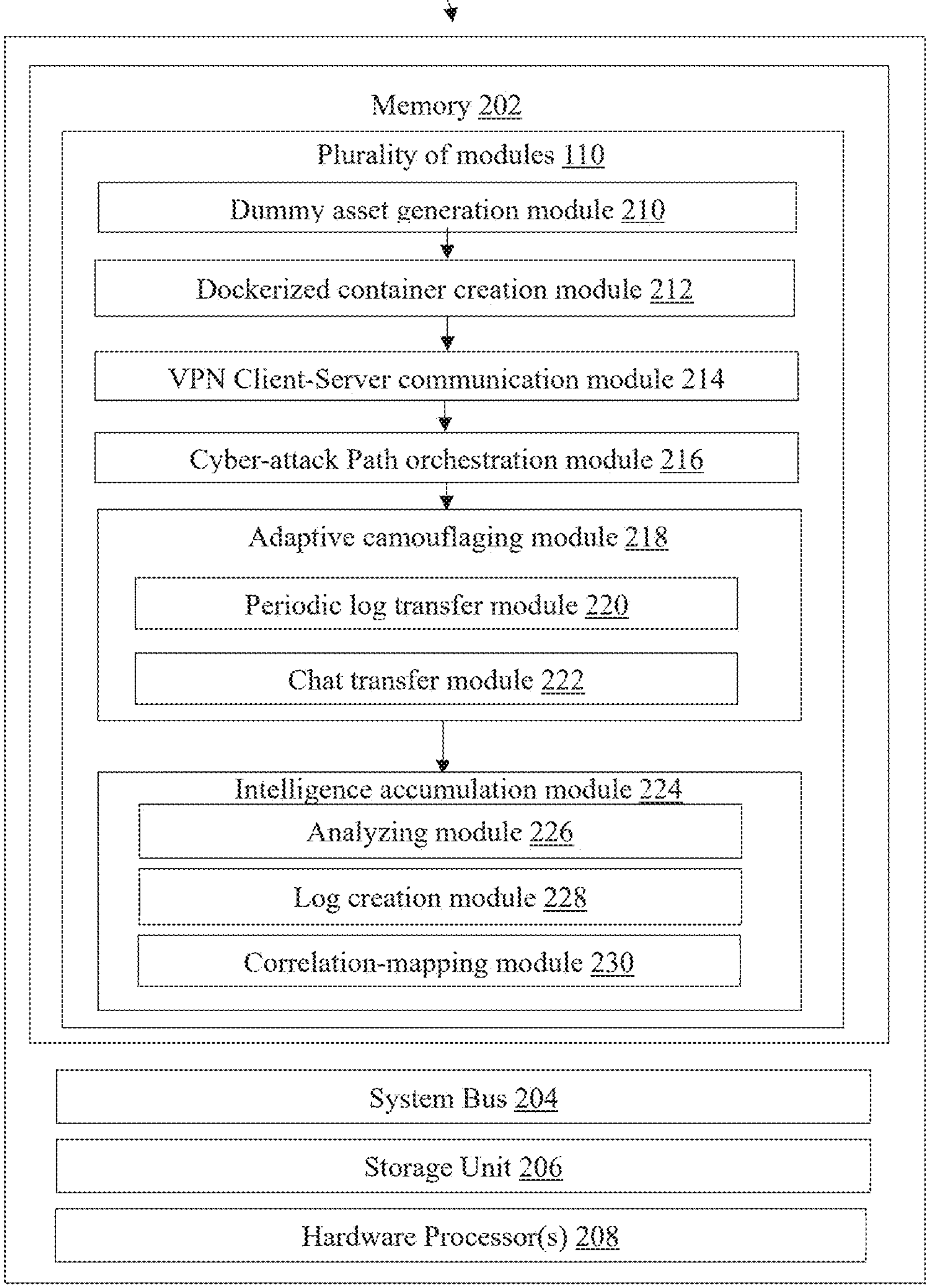
FIG. 2 illustrates block diagram illustrating an exemplary adaptive deception orchestration system, in accordance with an embodiment of the present invention.

FIG. 2 illustrates a block diagram illustrating an exemplary adaptive deception orchestration system, in accordance with an embodiment of the present invention.

In an embodiment, the adaptive deception orchestration system 104 includes one or more hardware processors 208, a memory 202 and a storage unit 206. The one or more hardware processors 208, the memory 202 and the storage unit 206 are communicatively coupled through a system bus 204 or any similar mechanism. The memory 202 comprises the plurality of modules 110 in the form of programmable instructions executable by the one or more hardware processors 208.

In an embodiment, the plurality of subsystem 110 comprises a dummy asset generation module 210. The dummy asset generation module 210 sends a request to an organizational server to collate and forward a plurality of defined organizational data. The defined organizational data may include a customization data and an organization internal data, wherein the customization data comprises of required number of users data, a service type data, a country of operation data, and a specific APT group data and the organization internal data. The organization internal data comprises of transactional data, customer data, employee data, financial data, operational data, market data, compliance and regulatory data, Intellectual Property data, security and access control data, and strategic planning data. Upon receipt of the defined organizational data from the organization server, the dummy asset generation module generates dummy assets based on the customization data and the organization internal data.

In an embodiment, the plurality of modules 110 further comprises a dockerized container creation module 212. Upon generation the dummy assets, the dockerized container creation module 212 creates virtual system groups. A "virtual system group" refers to a collection of virtual machines or virtual resources clubbed together within an computing environment. These virtual system groups can be created based on the specific demands of the organizations, for example as, a virtual system group of human resource, virtual system groups of management staff etc. The virtual system group is configured to store the generated dummy assets and mimic the various organizational roles within a typical organization. These help in misleading attackers into believing they are interacting with genuine systems within an authentic organizational network. Furthermore, the dockerized container creation module 212 masks the MAC address of the established virtual system groups making them indistinguishable from real organizational machines.

In an embodiment, a virtual machine client-server communication module establishes a plurality of virtual private network machines within the virtual system groups. The connection path ensures a secured and stable communication pathway. Each of virtual system group within the network infrastructure is equipped with virtual private network (VPN) client software. The network may consists of two LANs with distinct purposes. LAN1 serves as a common LAN for the unprivileged users. On the other hand, LAN2 houses critical assets (in a secure FTP server) and high privilege users. The VPN clients installed on each machine facilitate secure connections between users from different LANs, enabling seamless communication and efficient day-to-day operations. The VPN clients establish secure connections with the central VPN server, ensuring the stability and integrity of the network.

In an embodiment, the plurality of modules 110 further comprises a cyber-attack path orchestration module 214 configured to orchestrate cyber-attack scenarios. The cyber-attack path modulation 214 receives a plurality of behaviour patterns. The behavioural patterns are captured by analyzing the techniques, tactics and procedures used by the previous advanced persistent threat groups in their previous campaigns. The plurality of behavioural pattern may comprise at least a historical threat detection reports, and a historical attack pattern detection report. Upon receipt of the plurality of behavioural patterns, the cyber-attack path orchestration module orchestrates cyber-attack scenarios, by analyzing the received system log threat detection report and attack pattern detection report. Based on the analysis, the cyber-attack orchestration module places honey traps and implements tailored vulnerabilities of the virtual machines.

In an embodiment, the plurality of modules 110 further comprises of an adaptive camouflaging module 218. The adaptive camouflaging module 218 is configured to disguise a "chatterbox" application to resemble an internal chat application specific to the organization. The "chatterbox" application is an application that combines a secure chat capability along with the task of collecting and transmitting system logs for attacker behaviour analysis within an orchestrated honeypot network. The adaptive camouflaging module 218 comprises of a chat transfer module 220 and a periodic log transfer module 222. The chat transfer module 220 is used to to facilitate communication within the plurality users. Furthermore, the chat transfer module is configured to transfer chat interactions to an external server at predetermined time intervals. The periodic log transfer module 222 transfers the system logs and user activity at the predetermined time interval.

In an embodiment, the plurality of modules comprises an intelligence accumulation module 224. The intelligence accumulation module 224 comprises of an analyzing module 226, a log creation module 228 and a correction mapping module 230. The analyzing module 224 receives the system logs from the adaptive camouflaging module at each predetermined time interval and then analyses and correlates it for threat detection. The log creation module 228 is configured to create a system log for all the user activity and sessions, thereby capturing logs in the operational network without alerting the malicious users. The correlation mapping module is configured to map correlations between the captured system logs, user activity along with the detected threat to effectively analyze about the attack pattern of the advanced persistent threat groups.

Figure 3A:
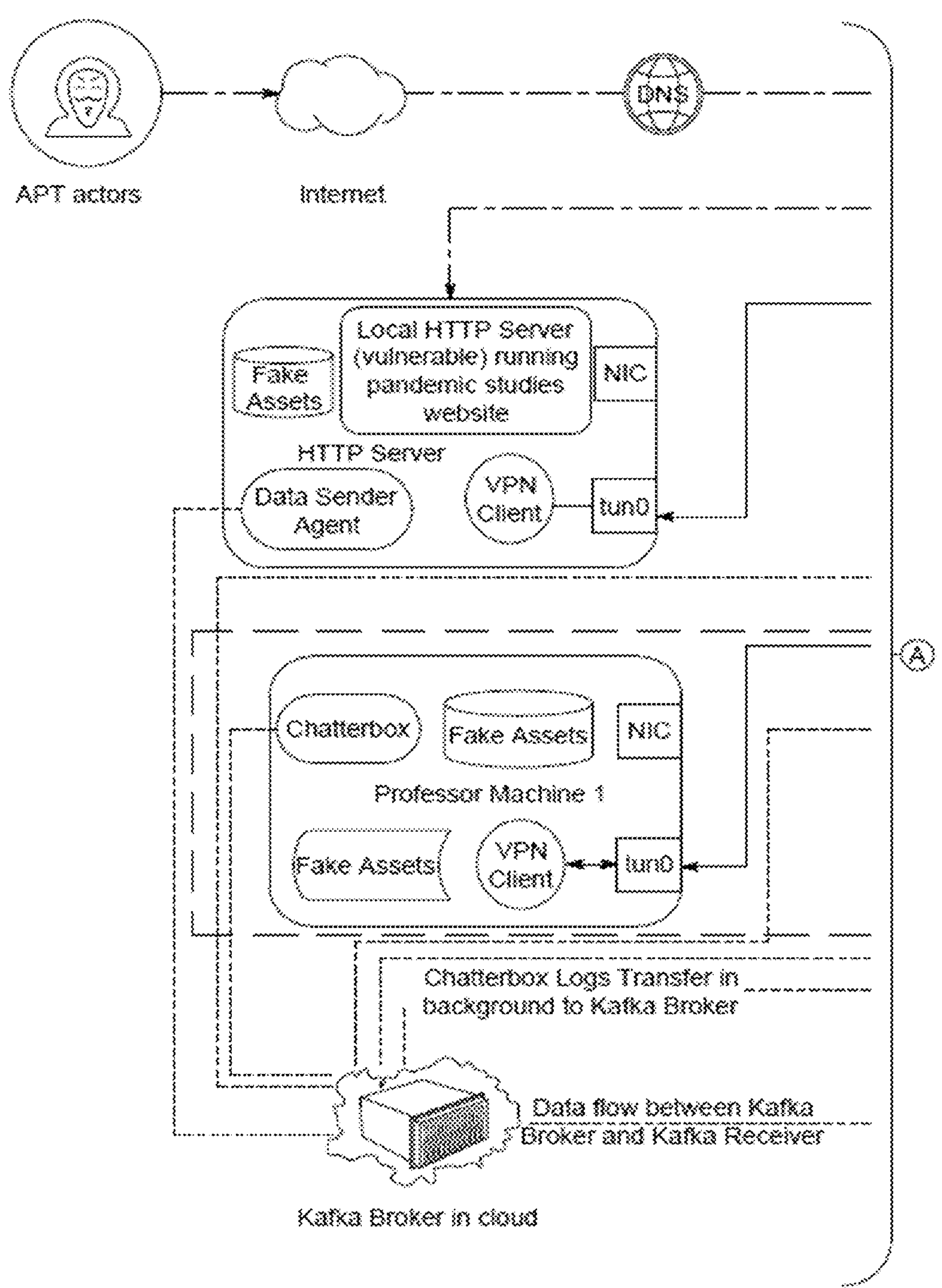
FIG. 3 illustrates an exemplary architecture of pandemic studies (operation network) hotspot, in accordance with an embodiment of the present invention.
Figure 3B:
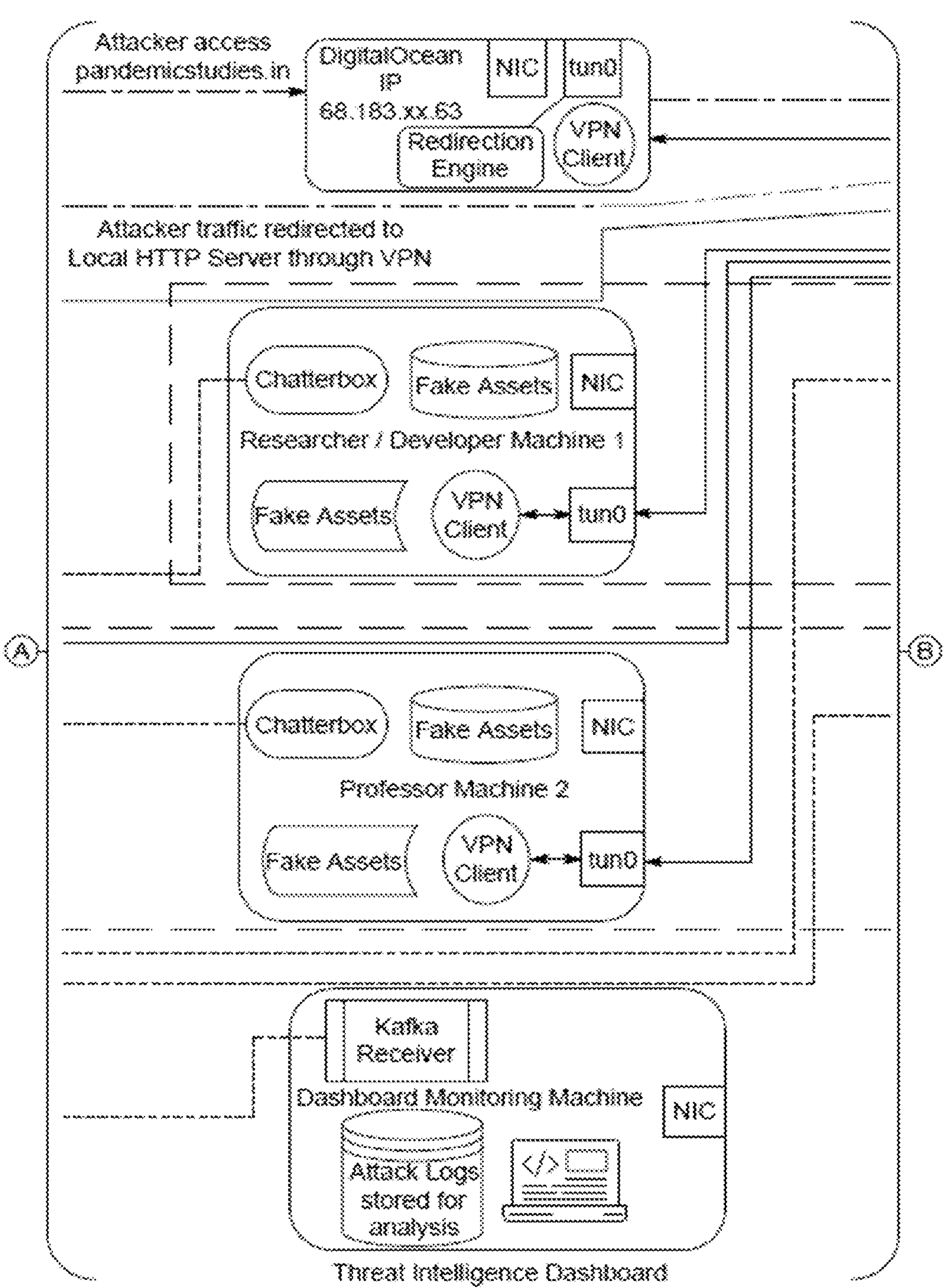
Figure 3C:
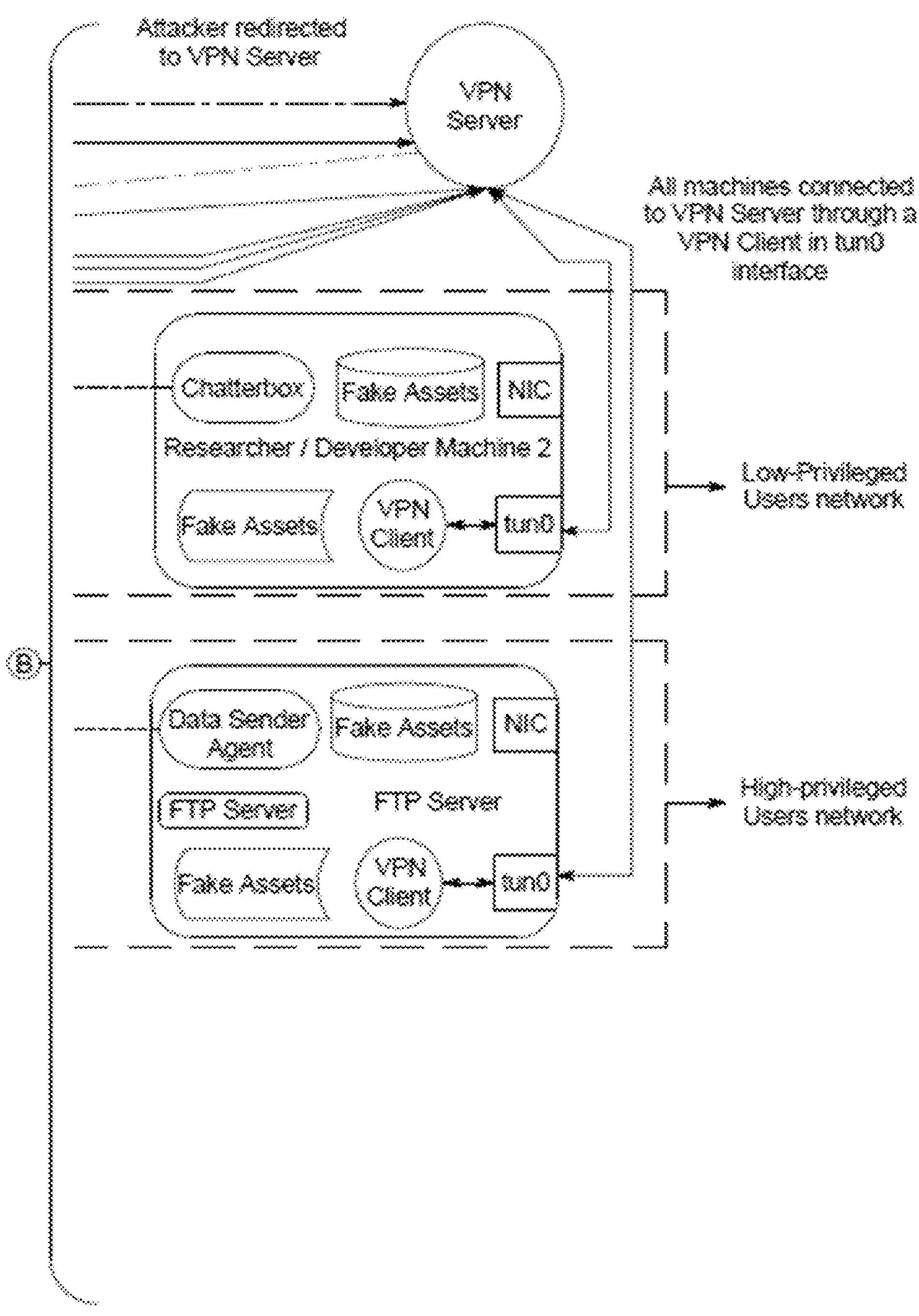

FIG. 3 is a block diagram illustrating the exemplary architecture of pandemic studies (operational network) hotspot, in accordance with an embodiment of the present invention.

FIG. 3 outlines the design and implementation of an operational network for a fictitious organization called "Pandemic Studies & Risk Surveillance Centre" (PSRSC) which is purportedly in close collaboration with government officials. This fictitious organization (PSRSC) specializes in pandemic and risk surveillance research and collaborates closely with ministries, government agencies, and other research organizations. The primary goal of this is to analyse classified data, assess pandemic trends within India, and formulate strategies for mitigating potential future events. This orchestrated honeypot network is specifically dedicated to active research related to the modelling spread of pandemics and similar systems, leading to development of strategies in managing them. The operational network design for this organization is depicted in the diagram below, showcasing the interconnected components and their relationships.

The Experimental setup of the architecture includes hist Personal Computers (PC's), Virtual machines, Researchers/Developers Machines (Dev-1 & Dev-2), Professors Machines (Prof-1 & Prof-2), HTTP Server, FTP Server, Fake Assets, VPN Client, and Chatterbox.

Three host personal computers (PCs) serve as the foundation for establishing a network infrastructure of the whole honeypot orchestration testbed consisting of virtual machines (VMs). The VMs are equipped with simulated assets and encompass a set of vulnerabilities and honey tokens that have been meticulously designed to orchestrate an operational network of national importance.

The six distinct virtual machines (VMs) represent various roles within a typical organization and house simulated assets, which are intentionally crafted to mislead the malicious users into believing they are interacting with genuine systems within an authentic organizational network. This approach greatly enhances the realism of the research organization, providing a highly authentic environment where the malicious users may encounter sensitive information of national importance.

Researchers/Developers Machines (Dev-1 & Dev-2): The VMs simulated the workstations of researchers/developers, utilizing the Ubuntu 20.04 LTS operating system. The VMs were equipped with a suite of commonly used research and development software, including VS Code, Python, MERN and LAMP stacks, Burp Suite, Chatterbox, VPN Client, and relevant libraries. In addition, the VMs house various research papers, datasets related to pandemic events further enhancing authenticity. The two VM's are connected to a low privileged network where the VMs do not have access to the critical resources of an organization.

Professors Machines (Prof-1 & Prof-2)/Virtual Machines (VMs): The VMs are configured to mimic the machines used by senior professors (directors of the orchestrated organization network) involved as principal investigators of some critical government projects. The VMS are set up with Windows-10 and contained ostensibly confidential documents such as unpublished research papers and Memoranda of Understanding (MoUs) with classified agencies. Software applications commonly used by professors, such as Microsoft Office, Chatterbox, VPN Client, and Zoom, e-mail client and other relevant applications are installed on these machines. The two VM's are connected to a high privileged network where the two VMs have access to the critical resources (FTP server) of an organization.

HTTP Server: The HTTP server is designed to host a vulnerable Apache 2.4.49 web server dedicated to host pandemic studies website, the VM plays a crucial role in the network. All incoming traffic directed to the public IP of the cloud-based machine is redirected to this locally hosted website. The setup creates the illusion of a live and interactive web presence. The VM also includes the installation of a VPN Client, the website's source code, a backup copy of the website's source code, and README files containing honey credentials.

FTP Server: the FTP server is a VM, further configured to contribute to the authenticity of the organizational network simulation. Similar to the other VMs, the FTP-VM is equipped with a VPN client for secure connections. It houses a File Transfer Protocol (FTP) server that stored Memoranda of Understanding (MoUs) with Ministries, other research labs, and research papers. The FTP server hosts 3 accounts. One guest account for all the users to share common data and 2 privileged user accounts for professors (where MoU and sensitive files and datasets are present).

During the deployment, the present invention makes sure that continuous activity across different users' machines to make it look live and authentic. Both HTTP and FTP server are dockerized container hosted inside respected VM's. Through careful configuration and deployment of the VMs, the simulated organizational network convincingly replicates the various components and roles found within a real organizational environment.

Within the VMs, various fabricated assets have been incorporated to enhance the authenticity of the computing environment 100. The assets include the website's source code, accompanied by a README file, hard-coded honey credentials, and a File Transfer Protocol (FTP) server housing Memoranda of Understanding (MoUs) with Ministries, other research labs, and research papers. The intentionally created assets contribute to the overall realism of the VM environment, providing an authentic research laboratory environment of importance.

To ensure secure communication and maintain network stability, each machine within the network infrastructure is equipped with virtual private network (VPN) client software. The network consists of two LANs with distinct purposes. LAN1 serves as a common LAN for unprivileged users, including developers and researchers. On the other hand, LAN2 houses critical assets (in a secure FTP server) and high privilege users (professors and heads of research labs). The VPN clients installed on each machine facilitate secure connections between users from different LANs, enabling seamless communication and efficient day-to-day operations. The VPN clients establish secure connections with the central VPN server, ensuring the stability and integrity of the network.

In the system architecture, the pandemic studies website is hosted on a local server, and secure communication is ensured by redirecting incoming traffic from the cloud-based machine's public IP to this local server. Virtual machines (VMs) containing fabricated assets, a Kafka broker, and Kafka receiver are deployed on separate networks. The VPN server is central to this architecture, unifying the networks and enhancing system efficiency. It is created using OpenVPN on a cloud machine, with a separate certificate authority (CA) machine for generating "ovpn" files for VPN client installation. A redirection engine plays a crucial role by rerouting incoming traffic intended for the public server to the local machine hosting the vulnerable web server.

Figure 4A:
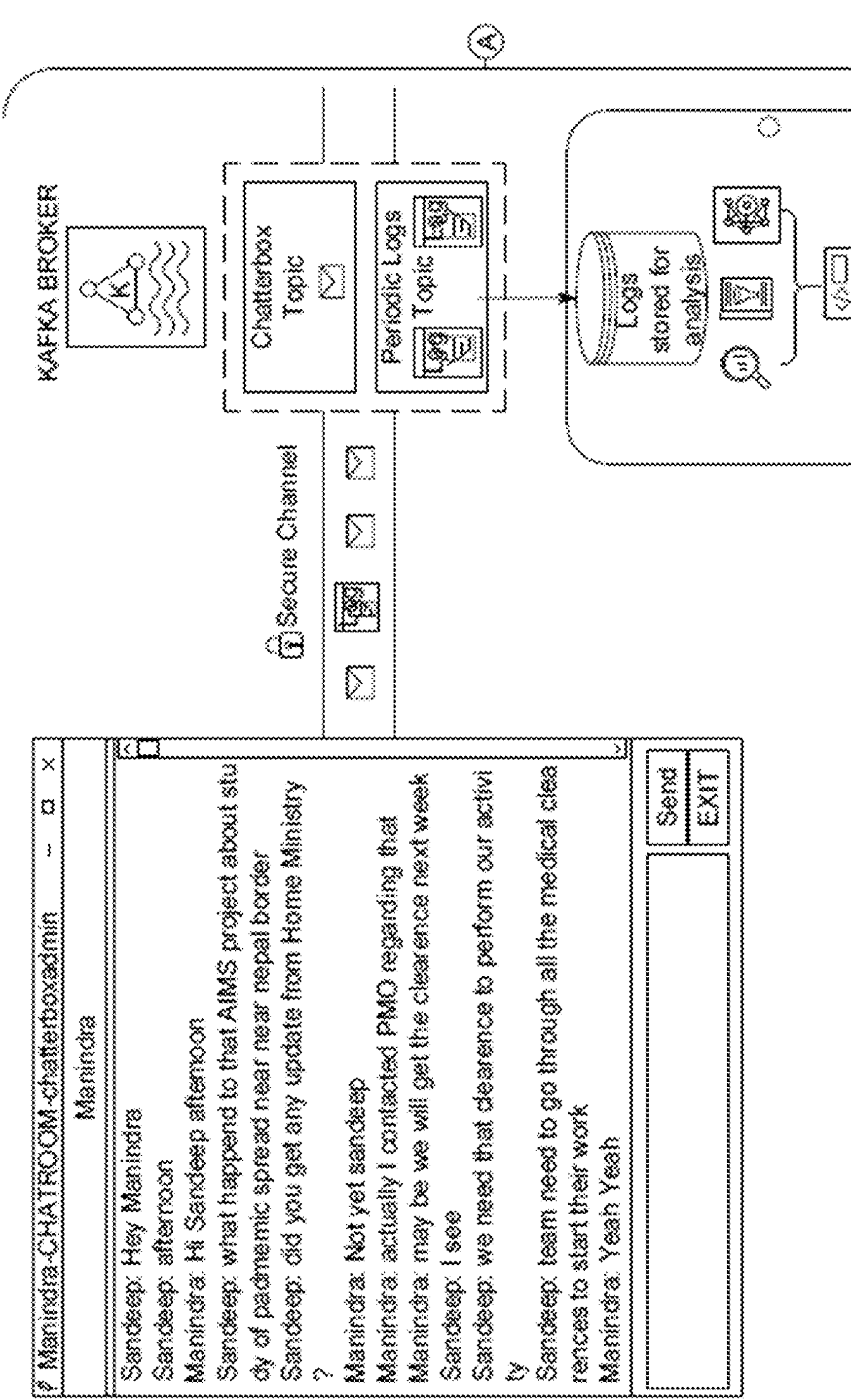
FIG. 4 illustrates the exemplary design of chatterbox application for active masking, in accordance with an embodiment of the present invention.
Figure 4B:
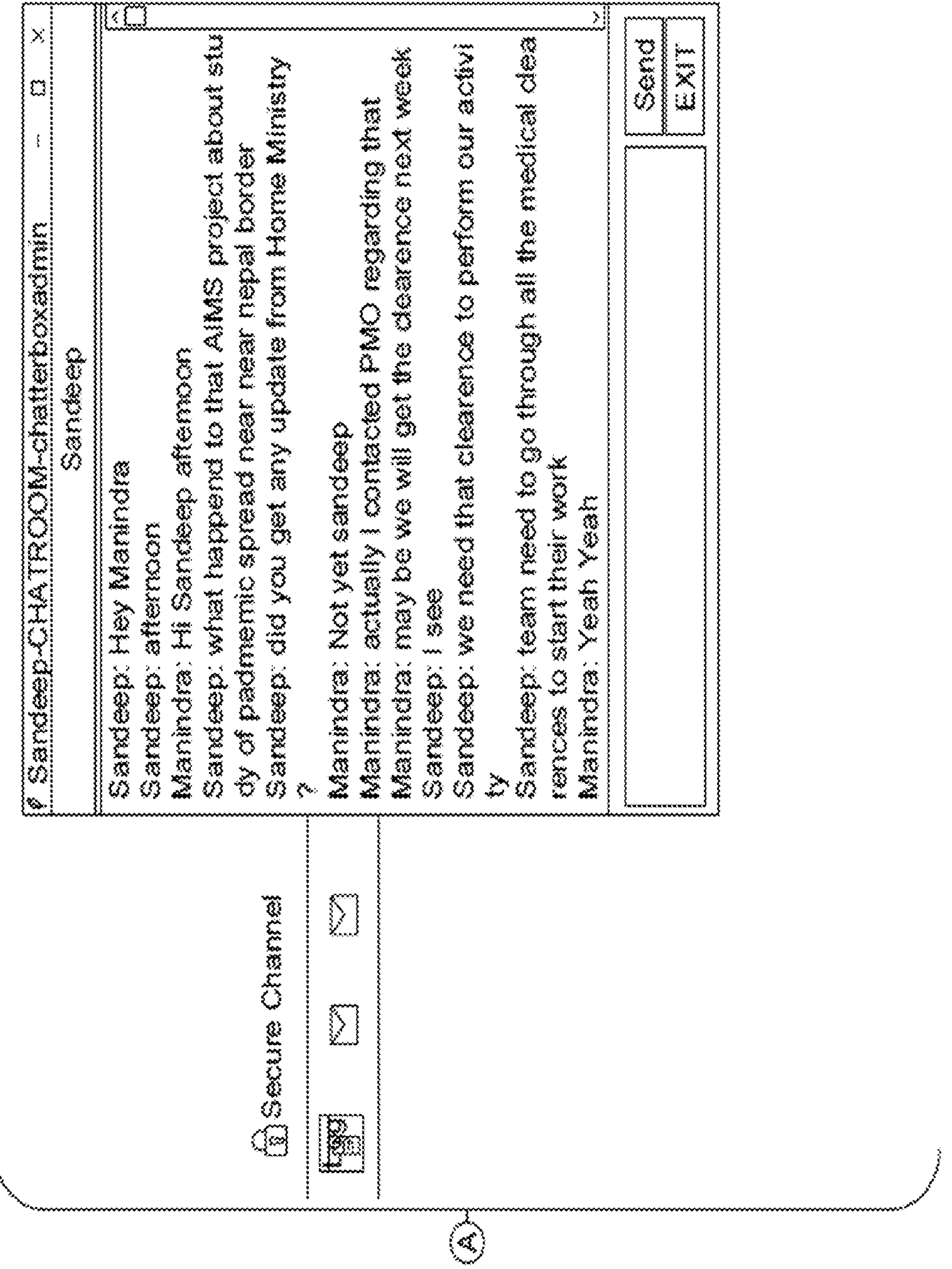
Figure 5A:
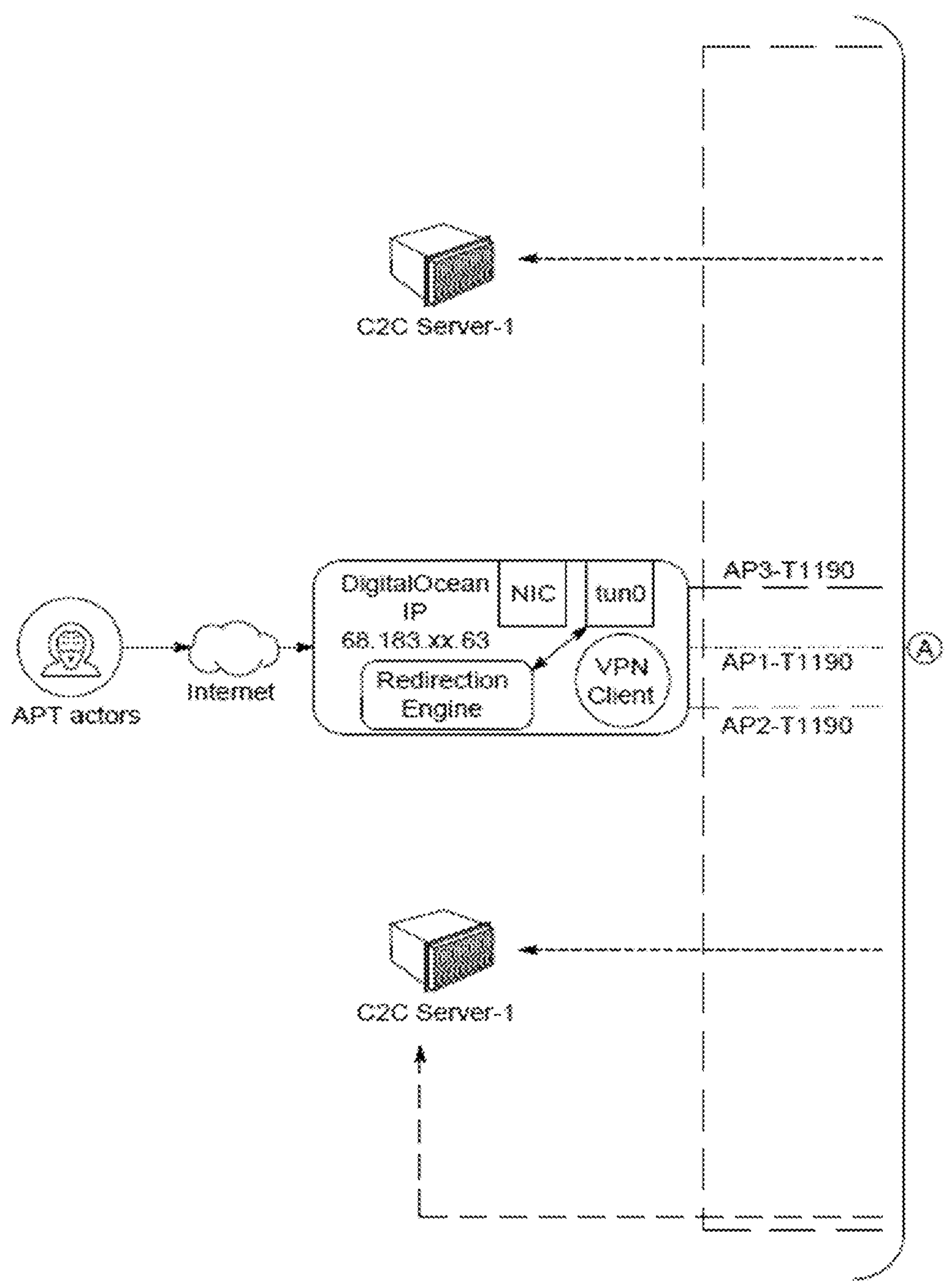
FIG. 5 illustrates orchestration of intruder entry paths in a honeypot network, in accordance with an embodiment of the present invention.
Figure 5B:
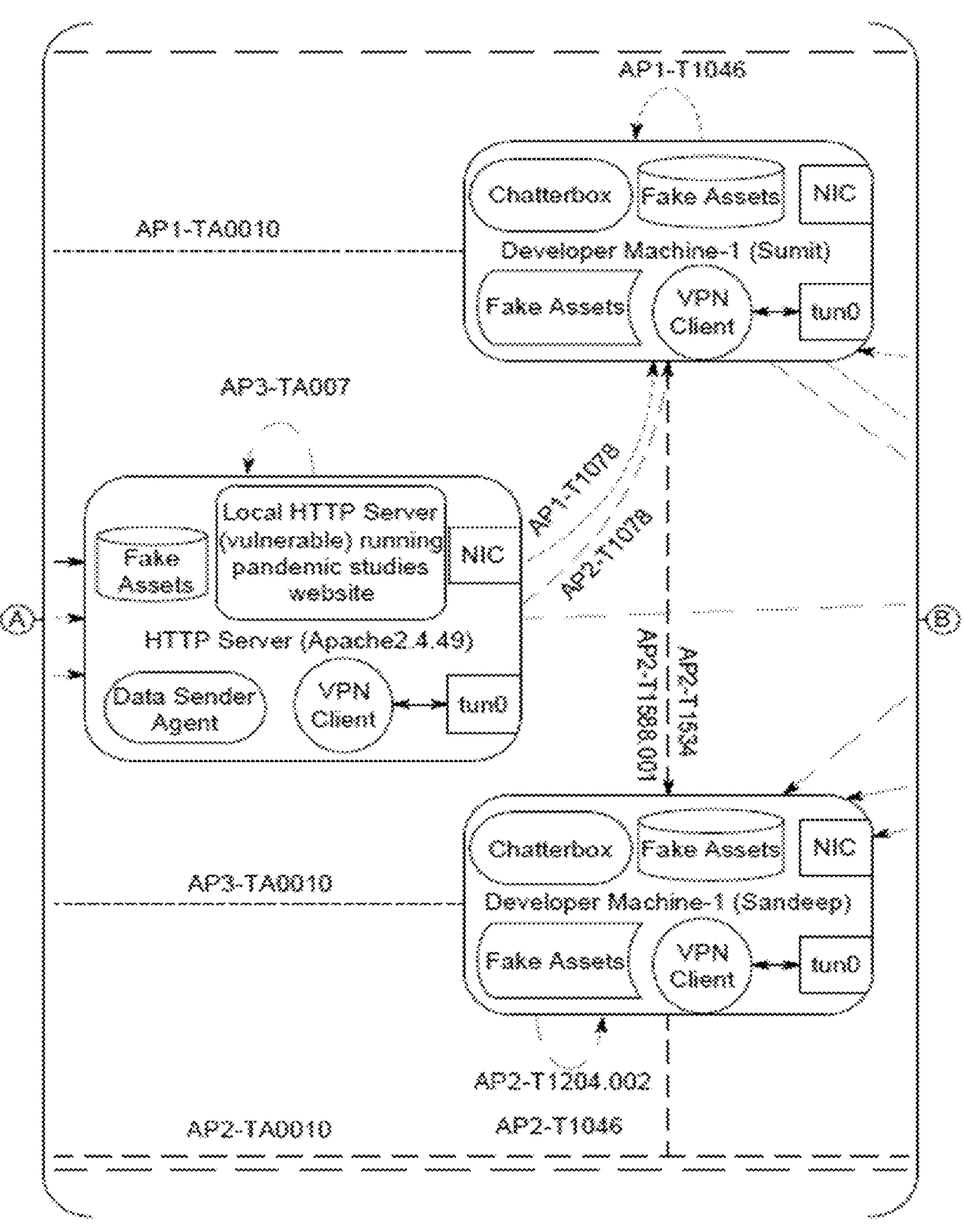
Figure 5C:
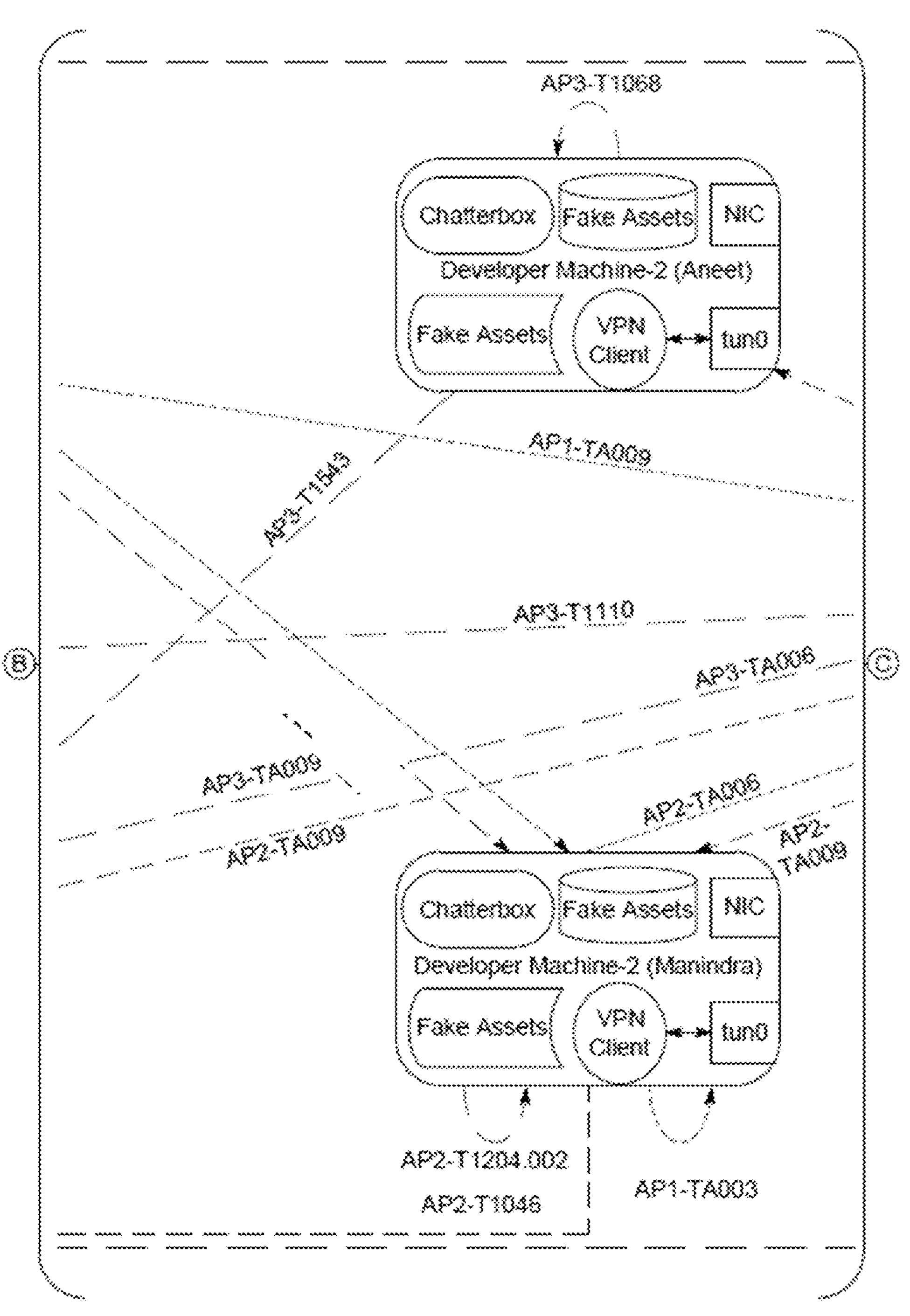
Figure 5D:
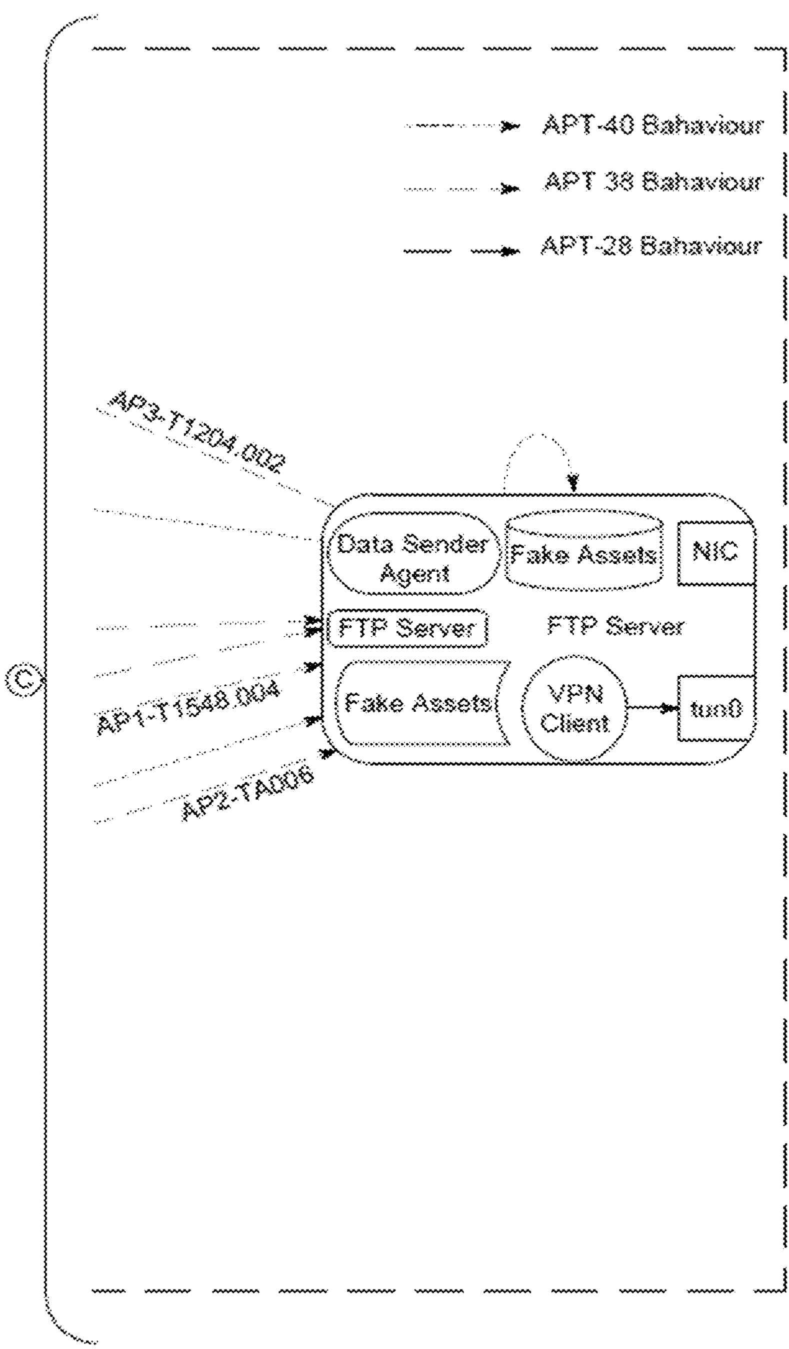

FIG. 4 illustrates the exemplary design of chatterbox application for active masking, in accordance with an embodiment of the present invention.

In the orchestrated honeypot network, the present invention deploys a camouflaged application called "Chatterbox", that combines secure chat capabilities with the critical task of collecting and transmitting system logs for the malicious user behaviour analysis within an orchestrated honeypot network. Firstly, the chatterbox functions as a conventional chat interface, establishing end-to-end communication channels between different users and user groups within an orchestrated organization through the Kafka broker. Secondly, the chatterbox operates as an unobtrusive log-transport mechanism, facilitating the periodic transfer of system logs from client-side nodes to the Kafka broker hosted on the same IP address as the chat application as shown in FIG. 4. The dual-functionality design allows for effective camouflage through covert data transmission, effectively misleading potential threat actors, while ensuring a periodic flow of system log data for analysis purposes.

The chatterbox application includes a tailor made set of functions to manage user interactions. The set of functions include login, joining user groups, and sending and receiving messages, all while ensuring secure message transmission via Kafka. Additionally, system logs are retrieved from client-side nodes and transmitted to the Kafka broker, enabling the tracking of the malicious user activity. Furthermore, it implements a scheduling component to ensure the regular transmission of logs for continuous monitoring of the malicious user activity. The chatterbox application has been designed for Linux and Windows environments. Also, for both linux and windows the present invention identifies the set of logs that can be transmitted in periodic intervals. List of logs being sent over a periodic interval is given in Table 1 and Table 2, respectively.

TABLE 1

List of Linux Logs transmitted in periodic intervals.

| S. No | Log Name | Log File Location | Kafka Topic Name |
|---|---|---|---|
| 1 | syslog | var/log/syslog | syslog-message |
| 2 | altlog | /var/log/alternatives.log | alternstivelog-message |
| 3 | anthlog | /var/log/auth.log | authlog-message |
| 4 | dpkglog | /var/log/auth.log | dpkglog-message |
| 5 | apthistorylog | /var/log/apt/history.log | apthistory-message |
| 6 | apttermlog | /var/log/apt/term.log | aptterm-message |

TABLE 2

List of Windows Logs transmitted in periodic intervals.

| S. No | Event Logs Name | Kafka Topic Name |
|---|---|---|
| 1 | Security | wndsystemdsecurity |
| 2 | System | wndsystemdsystem |
| 3 | Microsoft-Windows-Bits-Client/Operational | wndsystemdwindowsbit |
| 4 | Microsoft-Windows-AppLocker/EXE and DLL | windowsapplocker |
| 5 | System; Id = 7045 | windowsnewservice |
| 6 | Microsoft-Windows-Bits-Client/Operational; Id = 59 | windowsbitlocker |
| 7 | Microsoft-Windows-Windows Firewall With Advanced Security/Firewall | windowsfirewall |
| 8 | Microsoft-Windows-Windows Defender/Operational | windowsdefender |
| 9 | Microsoft-Windows-PowerShell/Operational | windowspowershell |

To effectively overcome the limitations of traditional honeypots in engaging sophisticated threat actors throughout the entire cyber-attack lifecycle, the present invention includes a unique approach. This involves meticulous orchestration of the honeypots, taking into consideration the Tactics, Techniques, and Procedures (TTPs) utilized by well-known APT threat actors. By strategically aligning the honeypots with these TTPs, the present invention aims to create highly realistic and targeted environments that effectively deceive and attract the attention of these sophisticated malicious users. In this regard the present invention creates a live operational network for the "Pandemic Studies & Risk Surveillance Center" (PSRSC). During the design of this operational network, careful consideration is given to the placement of honeytraps, and the implementation of vulnerabilities tailored to the behavior of three well known APT groups such as APT-40 (Chinese), APT-28 (Russian), and Lazarus group (North Korean).

FIG. 5 is a block diagram illustrating the orchestration of cyber-attack paths in the honeypot network, in accordance with an embodiment of the present invention.

Cyber-attack path-1 in the operational honeypot network focuses on implementing the specific vulnerabilities observed in the behavior of APT-40 (Tactics, Techniques, and Procedures). This cyber-attack path is designed to replicate the steps followed by APT-40 threat actors within the honeypot environment. The detailed list of TTPs related to the cyber-attack path-1 with corresponding descriptions is given in Table 3.

TABLE 3

TTP's corresponding to attack path-1.

| S. No | Orchestrated TTPs | Description |
|---|---|---|
| 1 | AP1-T1190 | Exploitation of vulnerabilities in Apache 2.4.49 web server |
| 2 | AP1-T1078 | Utilizing honey credentials to gain access to the internal network |
| 3 | AP1-T1563 | Exploiting anonymous FTP and vulnerable SMB services for lateral movement |
| 4 | AP1-TA003 | Maintaining persistence and conducting internal reconnaissance |
| 5 | AP1-T1548.004 | Gaining access to critical FTP servers |
| 6 | AP1-TA007 | Performing discovery within the FTP machines |
| 7 | AP1-TA009 | Collecting compromised data from the developer's machine |
| 8 | AP1-TA0010 | Exfiltrating sensitive data to external C2C servers |

In this cyber-attack path the initial step involves targeting the public facing web server, which utilizes Apache 2.4.49 (AP1-T1190). By exploiting vulnerabilities within this server, the malicious user can gain access to the system.

Within the web server's backup folder, the present invention deliberately places honey credentials in the "Readme.md" file, specifically targeting the developer's machine, in this case, dev-2 machine (AP1-T1078). The malicious user can use these honey credentials to attempt access to various machines within the internal network (AP1-T1078). Successful access to the dev-2 machine provides the malicious user entry into the internal network.

Since dev-2 machine is connected to a LAN utilized by general researchers and low-privileged users, the malicious user needs to perform lateral movement to gain access to higher privileged machines. To achieve this, malicious users need to exploit the anonymous FTP service and vulnerable SMB service present on one of the high-privileged user's machines (AP1-T1563).

Once the malicious user successfully gains access to a high-privileged user's (prof-1) machine and the network, their next objective is to maintain persistence within the compromised machine in high privileged network and conduct internal reconnaissance to identify critical FTP servers containing sensitive documents, classified MoUs, and datasets (AP1-TA003).

Using the honey credentials associated with the highly privileged user, the malicious user can gain access to the critical FTP server (AP1-T1548.004). The malicious users can proceed to perform discovery within the FTP machines, searching for relevant data (AP1-TA007), and ultimately can exfiltrate the collected sensitive data from one of the user machine to external C2C servers (AP1-TA0010).

Cyber-attack Path-2: The cyber-attack path 2 focuses on implementing the vulnerabilities based on the behavior of APT-38, also known as the Lazarus group, within the operational honeypot network. This cyber-attack path follows a specific sequence of actions carried out by the malicious user. The detailed list of TTPs related to Intruder entry Path-2 cyber-attack path 2, along with their corresponding descriptions, is provided in Table 4.

The cyber-attack begins by exploiting the public-facing web server, which utilizes Apache 2.4.49 (AP2-T1190). Within the web server's backup folder, carefully crafted honey credentials for the developer's machine (dev 2) are placed in the "Readme.md" file. The malicious user attempts to use these honey credentials on various machines within the internal network to gain access to the developer's machine (AP2-T1078).

As the developer's machine is connected to a LAN for general researchers and low-privileged users, the malicious user needs to laterally move to a high privileged user's machine. To achieve this, the attacker performs internal spear phishing, sending targeted emails to both professors in the high privileged network (AP2-T1534). For this the malicious users can use internal mail service that the present invention has created in the orchestrated honeypot network.

Once the payload is executed on any of the professor's machines (AP2-T1204.002), a backdoor can be created, allowing the malicious user to laterally move into the privileged network (AP2-T1588.001). Once inside the high privileged user's machine and network, the malicious user can aim to maintain persistence and conduct a network scan to identify the critical FTP server (AP2-T1046).

By using the honey credentials placed on the highly privileged user's machine, the malicious user gains access to the critical FTP server (AP2-TA006) containing sensitive documents, classified MOUs, and datasets.

From there, the malicious user collects data from the compromised FTP machine (AP2-TA009). Finally, the malicious user can exfiltrate the sensitive data to external C2C servers (AP2-TA0010). The detailed list of TTPs related to Intruder entry Path-2 cyber-attack path 2, along with their corresponding descriptions, is provided in Table 4.

TABLE 4

TTP's corresponding to attack path 2.

| S. No | Orchestrated TTPs | Description |
|---|---|---|
| 1 | AP2-T1190 | Exploitation of vulnerabilities in Apache 2.4.49 web server |
| 2 | AP2-T1078 | Gaining access to the internal network from the exploited web server |
| 3 | AP2-T1534 | Spear phishing to target professors in the high privileged network |
| 4 | AP2-1204.002 | Execution of payload in the professor's machine |
| 5 | AP2-T1588.001 | Creation of backdoor for lateral movement |
| 6 | AP2-1046 | Network scan to identify critical FTP server |
| 7 | AP2-TA006 | Gaining access to critical FTP server |
| 8 | AP2-TA009 | Collecting compromised data from the compromised machine |
| 9 | AP2-TA0010 | Exfiltrating sensitive data to external C2C servers |

Cyber-attack Path-3: The cyber-Attack Path-3 is designed to replicate the vulnerabilities and techniques observed in the behavior of APT-28 within the operational honeypot network. The cyber-Attack Path-3 follows a specific sequence of actions carried out by the malicious user. The detailed list of TTPs related to the cyber-attack path-3 with corresponding descriptions is given in Table 5.

TABLE 5

TTP's corresponding to attack path 3.

| S. No | Orchestrated TTPs | Description |
| --- | --- | --- |
| 1 | AP3-T1190 | Exploitation of vulnerabilities in Apache 2.4.49 web server |
| 2 | AP3-T1110 | Gaining access to the FTP guest account |
| 3 | AP3-T1204.002 | Executing the payload in the decoy file |
| 4 | AP3-T1068 | Escalating privileges and executing commands with root privileges |
| 5 | AP3-T1543 | Lateral movement through internal spear phishing |
| 6 | AP3-TA006 | Gaining access to critical FTP servers |
| 7 | AP3-TA009 | Collecting compromised data from the compromised machine |
| 8 | AP3-TA0010 | Exfiltrating sensitive data to external C2C servers |

Firstly, the malicious user identifies the public-facing web server that uses Apache 2.4.49 and exploits its vulnerabilities (AP3-T1190). Once inside the network, the malicious user conducts a network scan to discover the internal guest FTP server accessible to all users. Simultaneously, the malicious user can identify a vulnerable kernel on the researcher's machine (dev-1) and exploits it using CVE-2022-0847.

To gain access to the researcher's machine (dev-1), the malicious user attempts different passwords for the guest FTP account (AP3-T1110). Once successful, the malicious user places a decoy document that contains a payload exploiting CVE-2022-0847, making it reachable to the researcher (dev-1) machine.

When the researcher (dev-1) executes the payload in the decoy file (AP3-T1204.002), the payload escalates privileges by exploiting CVE-2022-0847 and executes commands with root privileges (AP3-T1068). This allows the malicious user to move from compromised web server to the researcher's machine (dev 1).

Since dev-1 machine is connected to a LAN for general researchers and low-privileged users, the malicious user needs to laterally move to a high-privileged user's machine. The malicious users carry out internal spear phishing from dev-1 machine, sending malicious payloads to the professors' machines (prof-2). Once executed by the privileged users, the malicious user laterally moves from dev-1 machine to the professor's machine (prof-2) (AP3-T1543).

Once inside the high privileged user's machine and network, the malicious user maintains persistence and can conduct internal reconnaissance to identify critical FTP servers containing sensitive documents, classified MoUs, and datasets. By using honey credentials placed on the highly privileged user's machine, the malicious user gains access to the critical FTP server (AP3-TA006).

Following this, the malicious user collects compromised data from the critical FTP server to any one of the compromised machines (AP3-TA009). Finally, the malicious user exfiltrates the sensitive data collected from the compromised machine to external C2C servers (AP3-TA0010).

The behavioral honeypots tailored to specific APT group behaviors are deployed to closely observe and analyse the malicious user movements and activities within the honeypot network. This entails tracking the cyber-attacks, identifying the paths malicious users follow within the honeypot network, and correlating event logs from various machines to gain comprehensive insights into the cyber-attacker's behaviour. To achieve this, two main analysis methods are employed. First, the timestamp-based cyber-attack correlation analysis is conducted across different machines within the honeypot network, beginning with the identification of malicious IPs and payload tracking on vulnerable web servers. Second, snapshots are captured of various machines whenever anomalous activities are detected in the honeypot. Subsequently, a thorough examination of these snapshots' hard disks and registry to uncover traces of malicious payloads used by the malicious users. Additionally, open-source sensitive information sources are leveraged, such as abuseIPdb and IP-geolocation tracking, along with past reports on similar activities, to gain a deeper understanding of the malicious user's movement, sophistication level and behaviour. Finally, the systematic mapping of the observed behaviour of advanced persistent group's tactics, techniques and procedures (TTPs) during the cyber-attack path tracking is done.

Figure 6:
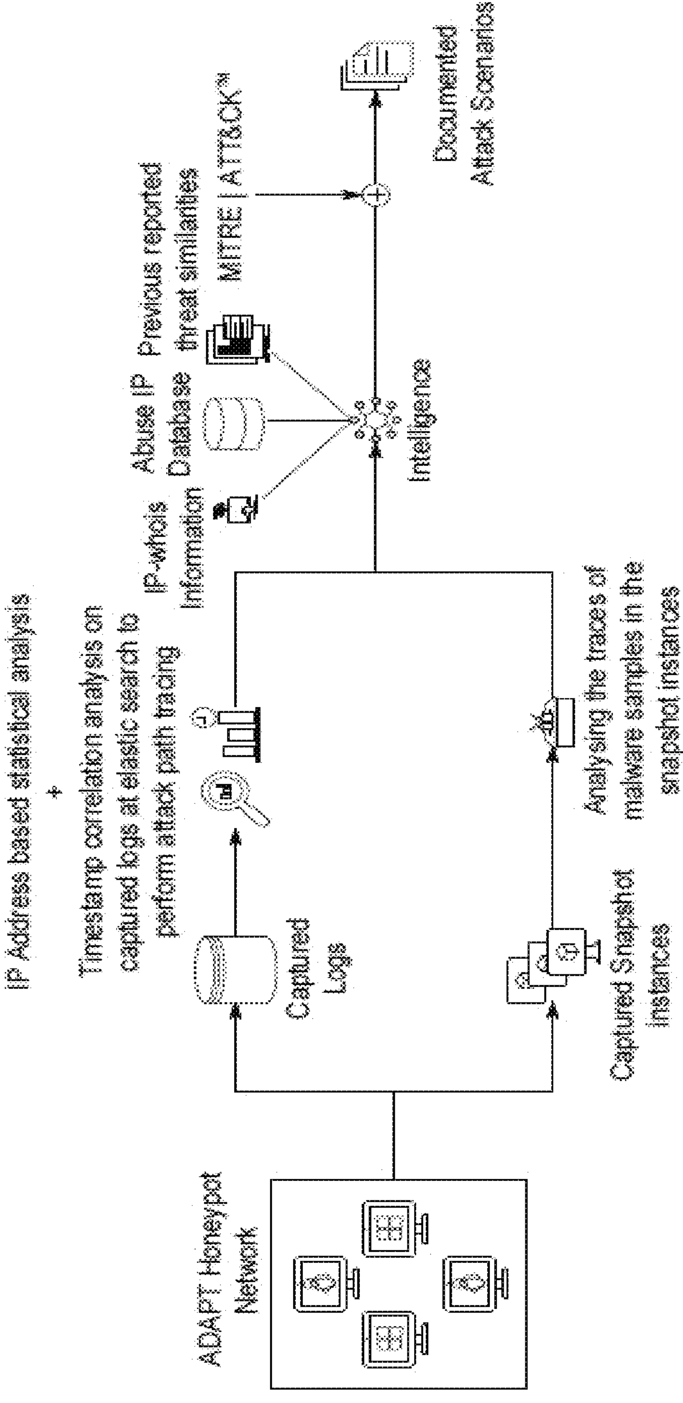
FIG. 6 illustrates methodology for extracting cyber-attack scenarios observed in the honeypot network, in accordance with an embodiment of the present invention.

FIG. 6 is a block diagram illustrating methodology for extracting cyber-attack scenarios observed in the honeypot network, in accordance with an embodiment of the present invention.

The methodology for obtaining cyber-security related sensitive information comprises a) monitoring by the honeypot orchestration the behavior and activity of malicious users at each machine. This provides valuable insights into their techniques and tactics throughout the cyber-attack lifecycle. b) monitoring the network traffic at both the digital ocean IP address and the internal HTTP server to identify external traffic patterns and the types of requests used by the malicious users to target the web server. Customized agents installed on the redirection engine and internal HTTP server (vulnerable) enables to track and analyze this activity effectively. c) Upon the malicious user breaching the HTTP server and gaining access to the internal network, the "chatterbox" application becomes a valuable source of sensitive information. The Chatterbox application provides real-time information such as firewall activity, Windows defender logs, BITS admin event logs, PowerShell activity, and critical security logs from Windows machines. Additionally, from Linux machines, the authentication logs, system logs, dpkg logs, and command history logs (refer Table. 1 and Table. 2) are captured. The chatterbox application securely sends these logs to a Kafka broker hosted on the same IP address as the chat application, ensuring encrypted transmission at periodic intervals. d) installing an agent on the FTP server to capture and send user activity logs to the Kafka broker at regular intervals. Installing an agent includes recording details of file uploads, downloads, and the calculation of hash values for updated files, all transmitted through a secure encrypted channel. e) Incorporating by the Kafka receiver customized scripts to preprocess the diverse range of logs collected. This preprocessing step ensures that the logs are structured and indexed in a format suitable for further analysis. f) protecting against potential sabotage attempts by the malicious users, a secure state is maintained for each machine. In the event of dangerous payloads like wipers or ransomware, the custom scripts are implemented to revert the entire system back to its previous secured state. This capability allows the system to quickly recover and reuse the system for trapping new sets of the malicious users.

Figure 7:
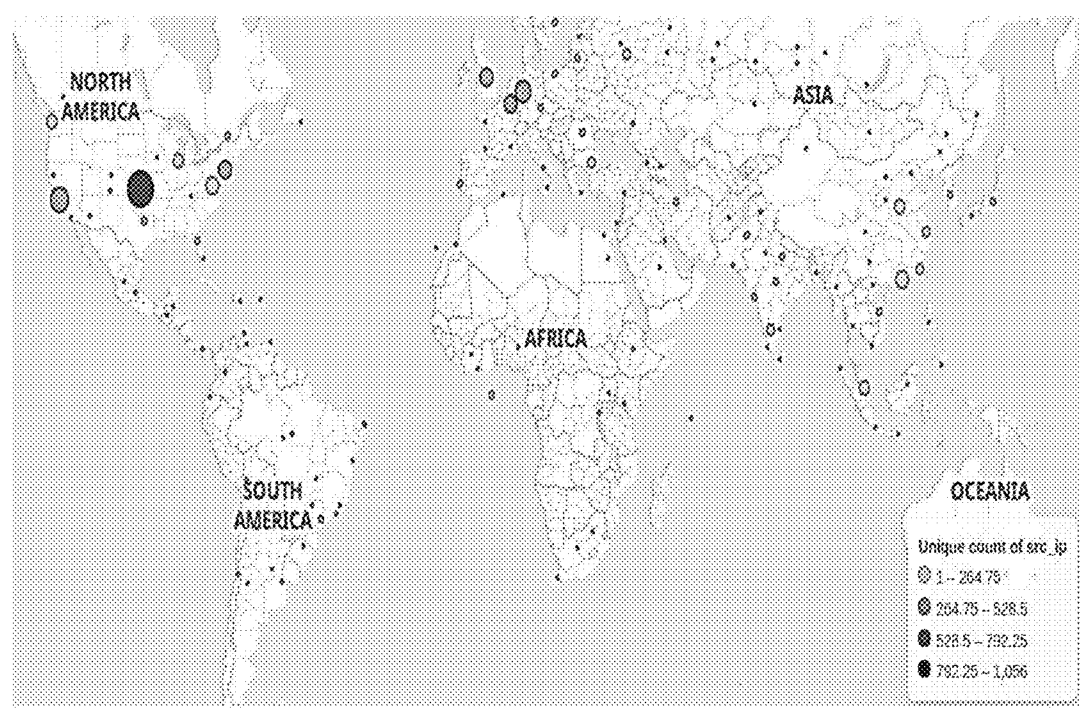
FIG. 7 illustrates geo-location mapping of the Unique Source IP addressed targeted by the honeypot, in accordance with an embodiment of the present invention.

FIG. 7 illustrates Geo-location mapping of the Unique Source IP addresses targeted by the Honeypot, in accordance with an embodiment of the present invention.

In this analysis, systematic mapping of the IP locations of the targeted malicious users and the payloads executed on the web server in the attempts to breach the network is illustrated. Geo-location maps illustrating the malicious user's focus on a live organizational network and a word cloud displaying vulnerable web server logs are presented.

Figure 8:
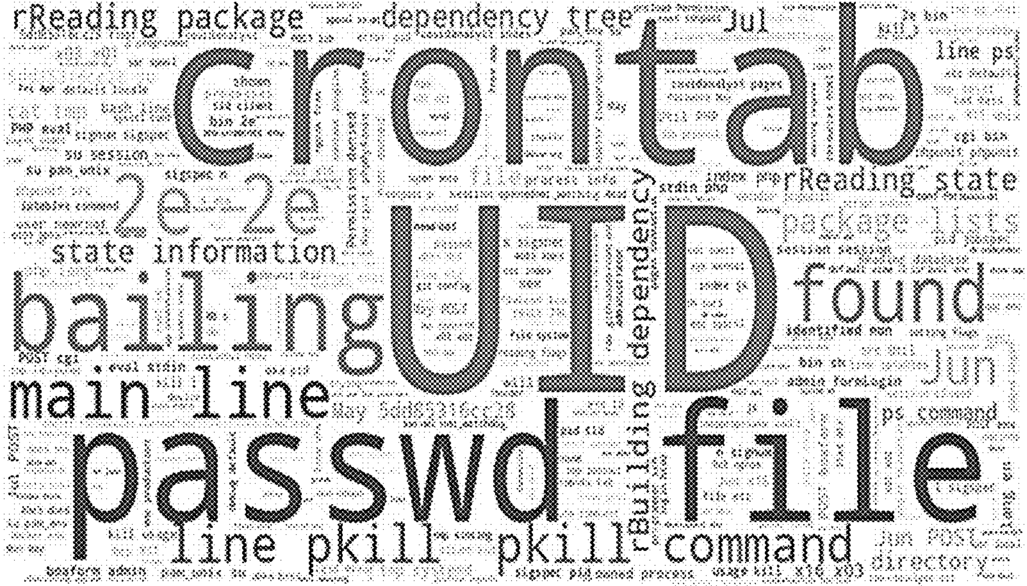
FIG. 8 illustrates a word cloud of the payload logs observed at a honeypot web server, in accordance with an embodiment of the present invention.

FIG. 8 illustrates word cloud of the payload logs observed at the honeypot webserver, in accordance with an embodiment of the present invention.

During the analysis it is observed that most botnet traffic comes from certain nodes (such as North America and European Tor) exit nodes, with a notable presence of traffic related to cryptojacking malware operations. Additionally, persistent cyber-attacks within the live organizational honeypot were observed originating from the other node (such as, Hong Kong region of China). FIG. 8 highlights that many malicious users attempted to access the "/etc/passwd" file and create cron jobs in order to establish persistence and create a backdoor in the web server.

According to the exemplary analysis of the present invention, over a deployment duration of 100 days, the total number of recorded hits on the orchestrated honeypot network amounts to 13,906,945 from 4238 unique IP addresses across the world. During the first 45 days, the present invention observed high volumes of traffic, primarily stemming from web scrapers and DOS cyber-attacks originating from North America and Europe. Subsequently, a stabilization in traffic activity is noticed, with more sophisticated cyber-attacks emerging from China and Hong Kong during this period.

Figure 9A:
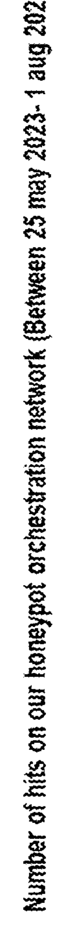
FIGS. 9(*a*) and 9(*b*) illustrates a number of hits on the on the honeypot network deployment for over a period of time, in accordance with an embodiment of the present invention.
Figure 9A:
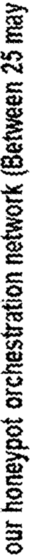
Figure 9B:
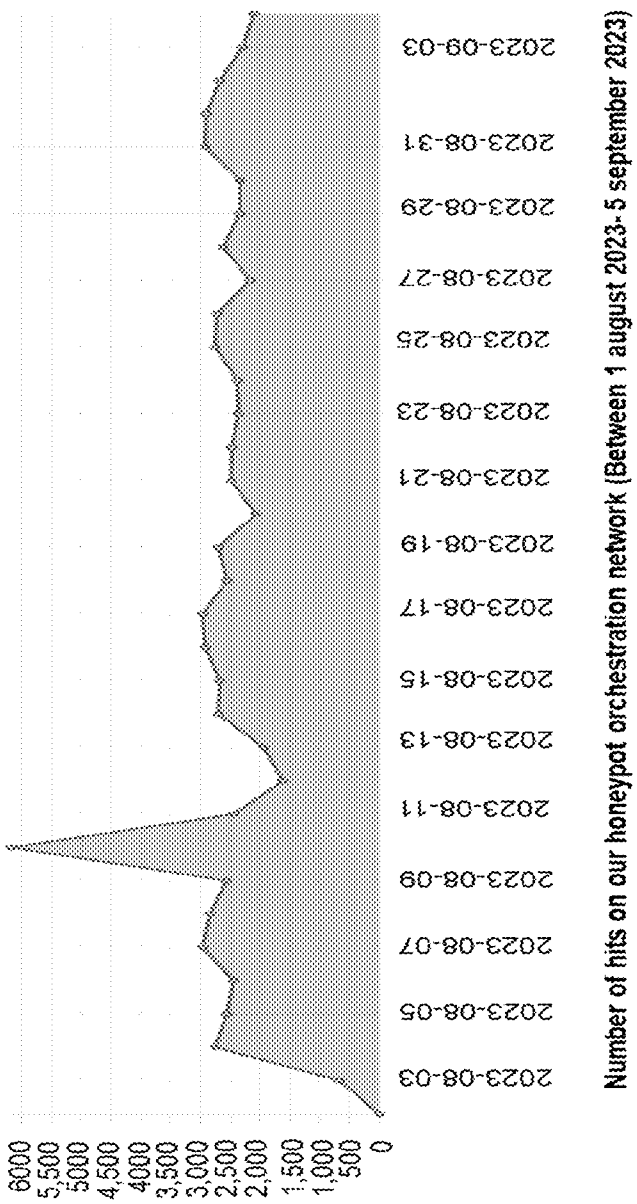

FIGS. 9(*a*) and 9(*b*) illustrates number of hits on the honeypot network deployment over a period of time, in accordance with an embodiment of the present invention.

The honeypot network deployed was monitored for over 100 days. The honeypot server experienced downtime on Jul. 18, 2023, due to a high volume of incoming packets. The detailed analysis of the cyber-attacks observed on the live honeypot network is detailed in the following figures.

Figure 10:
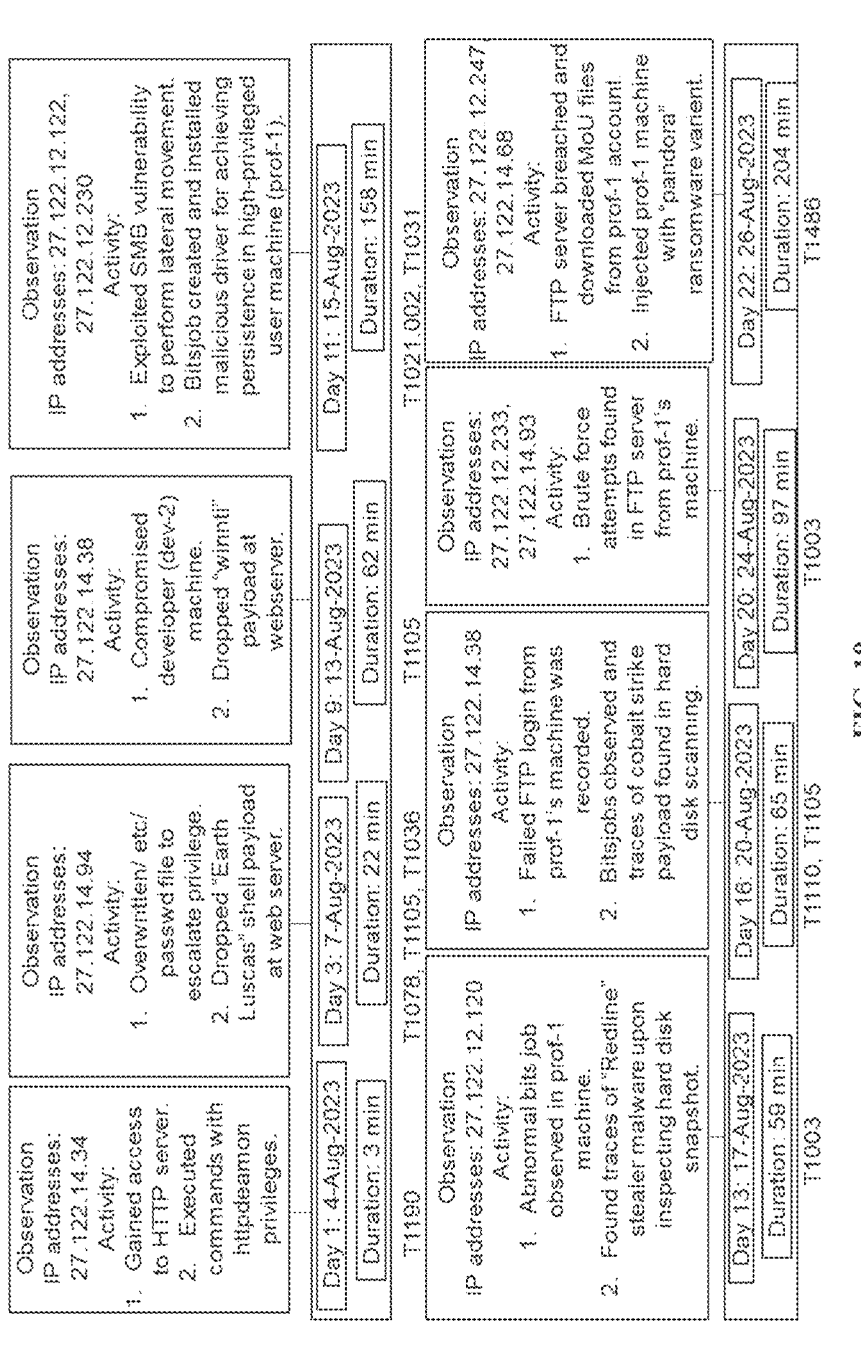
FIG. 10 illustrates an exemplary cyber-attack timeline for scenario 1, in accordance with an embodiment of the present invention.

FIG. 10 illustrates an exemplary cyber-attack timeline for scenario 1, in accordance with an embodiment of the present invention.

In the deployed honeypot network, the present invention observed a prolonged and highly sophisticated cyber-attack campaign originating from a group of IP addresses located in Hong Kong. This extensive campaign spanned over 22 days, making it a significant observation. The cyber-attackers demonstrated a series of exploits on both the web server and internal machines, showcasing their advanced capabilities. The cyber-attack timeline included various stages, such as initial compromise, privilege escalation, network discovery, and the deployment of malicious payloads, including ransomware. Notably, the correlation of the cyber-attack points suggests the involvement of Chinese threat actors, given the presence of Earth Luscas RAT traces, Winnti backdoor usage, Cobalt Strike tools, Redline info stealer, and the utilization of Hong Kong-based IP addresses concealed behind VPN servers, a characteristic technique of Chinese APT groups. The cyber-attackers' final act of deploying Pandora ransomware further underscores their sophistication and tactics to obfuscate their activities, aligning with past Chinese cyber espionage strategies.

On the first day, the honeypot's vulnerable web server was compromised, and the cyber-attackers gained "httpdeamon" access to the server. Following this, they proceeded to execute various shell commands with "httpdeamon" privileges. The cyber-attack originated from a specific (Hong Kong-based) IP address 27.122.14.34.

On the fourth day, it was observed that the cyber-attacker escalated privileges by exploiting the/cgi-bin vulnerability and overwriting the/etc/passwd file on the web server. This privilege escalation allowed the cyber-attacker to introduce a shell payload from the "Earth Luscas" family, which was renamed "cron.sh" on the web server. After assigning execution permissions, the trojan payload was triggered to create a backdoor on the server. The cyber-attack originated from IP address 27.122.14.94 in Hong Kong.

On the ninth day, anomalous activity were detected within the honeypot network. On this day, the cyber-attacker logged into the webserver through the established backdoor at 4:58 AM IST. Subsequently, the cyber-attacker traversed various directories on the web server, including backup folders, and conducted activities such as executing "ipconfig" and performing a port scan to assess the internal network structure. Notably, the cyber-attacker leveraged honeytokens designed during the honeypot setup to compromise the dev-2 machine, a developer connected to a low-privileged network. On the same day, the cyber-attacker introduced the Winnti payload onto the webserver. This cyber-attack was traced back to the Hong Kong IP address 27.122.14.38.

On the eleventh day malicious traffic was observed on the web server at 4:08 AM IST. Subsequently, at 4:17 AM IST, abnormal incoming connections were detected on dev-2's machine, with further observations of the cyber-attacker's movement from the low-privileged network to the high-privileged network at around 5:32 AM IST. The cyber-attacker targeted the vulnerable SMB machine belonging to high-privileged user(prof-1), where they enumerated group membership credentials. The cyber-attacker utilized BITS job for downloading additional payloads and achieved the assignment of special privileges to the "newlogon" user. Following this, a new driver was installed on prof 1's machine to establish persistence. It was noted that the cyber-attacker attempted to install malicious software with elevated privileges during this cyber-attack, which involved two IP addresses, 27.122.12.122 and 27.122.12.230, and occurred between 4:08 AM and 6:46 AM IST.

On the thirteenth day, an abnormal BIT'S job was created on prof 1's machine. Upon inspecting the snapshot image's hard disk, traces of the Redline stealer, a credential-stealing malware, were discovered on prof-1's machine. This cyber-attack originated from IP address 27.122.12.120 and transpired between 3:46 AM and 4:45 AM IST.

Likewise, on the sixteenth day, abnormal activity was observed on the webserver, with an attempt to access the critical FTP server in the high-privileged network at 6:21 AM IST. Failed FTP login attempts were identified in the FTP logs originating from high-privileged user (prof-1) machine. Additionally, BITS job activities were identified on prof 1's machine, with traces of Cobalt Strike payloads found on hard disk. Notably, there was a significant reduction in log activity on this day. The cyber-attack was initiated from IP address 27.122.14.38 and lasted for approximately 65 minutes.

On the twentieth day, abnormal web activity was detected in the web server logs, followed by abnormal user activity and new user logon on prof 1's machine at 4:28 AM IST. Subsequently, multiple failed login attempts were recorded in the FTP server logs at 5:12 AM IST. This operation extended for approximately 2 hours and originated from Hong Kong-based IP addresses 27.122.12.233 and 27.122.14.93.

Two days later, malicious activity was observed on the web server, with a surge in brute-force attempts on the FTP server from the professor machine around 20:50 IST. At approximately 21:29 IST, the cyber-attackers successfully breached the FTP server and downloaded strategically placed zip files bearing Indian ministry names. Later, at 23:30 IST, high-privileged user (prof-1) machine was infected with the "Pandora" ransomware. This extensive campaign spanned over 22 days and gave a significant understanding of cyber-attackers modus operandi.

Figure 11A:
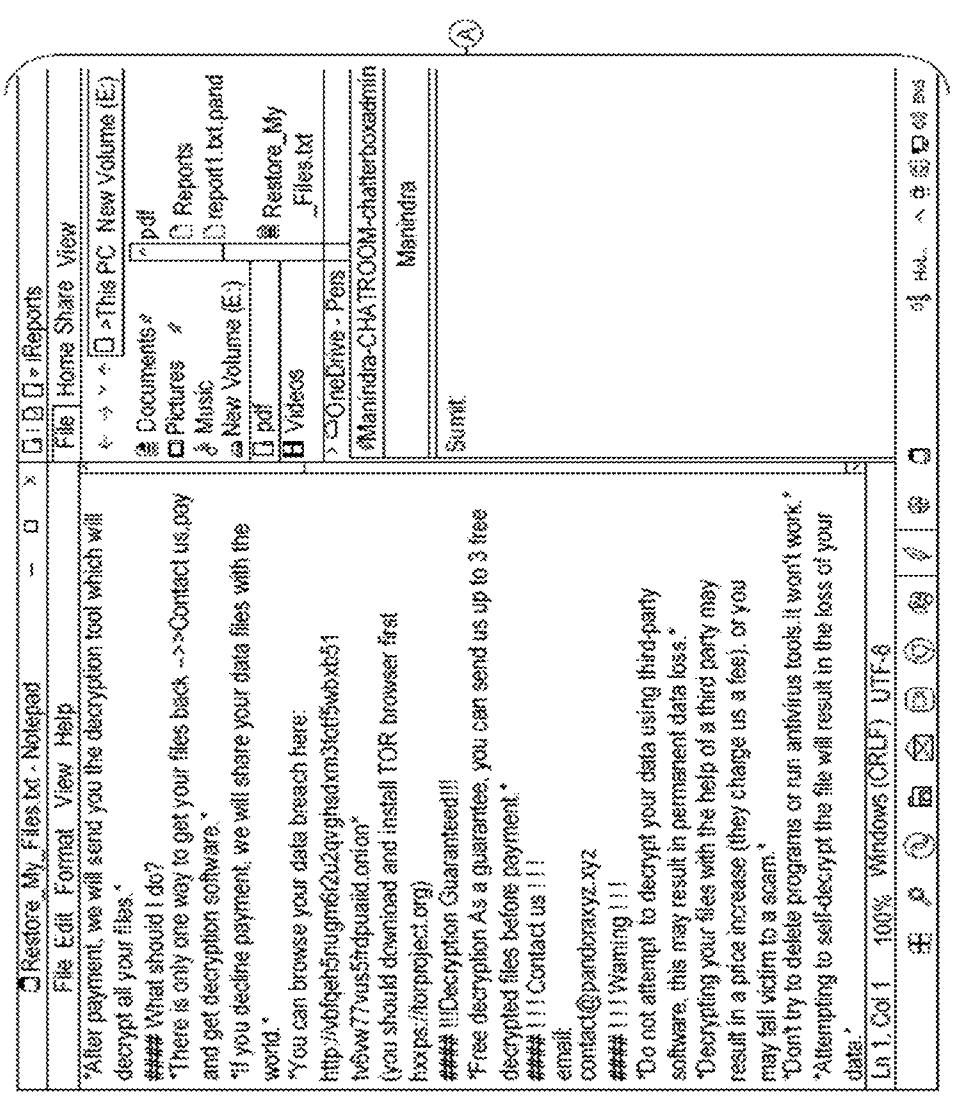
FIG. 11 illustrates an exemplary high privileged machine infected with Pandora ransomware, in accordance with an embodiment of the present invention.
Figure 11B:
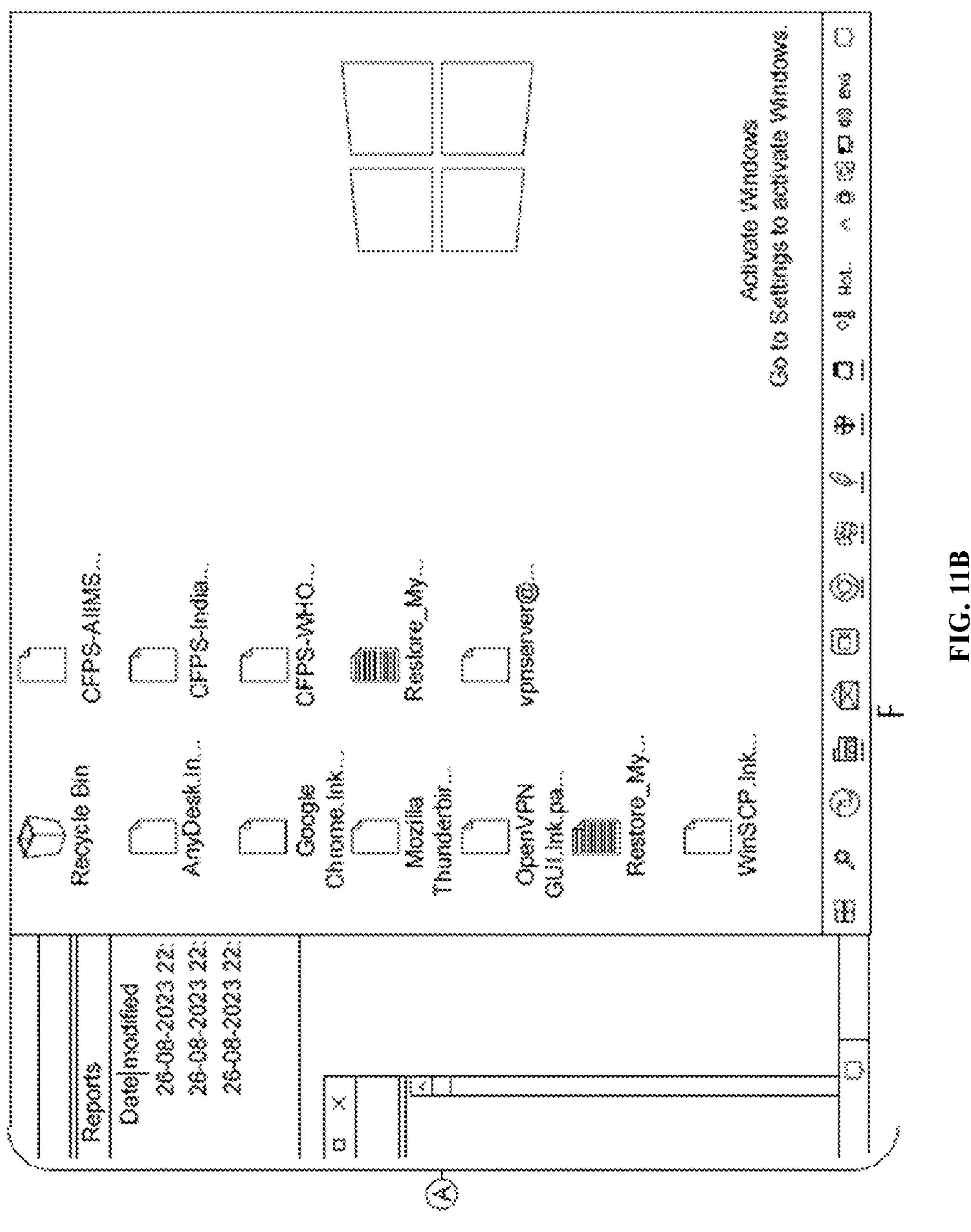

FIG. 11 illustrates an exemplary high-privileged user machine infected with Pandora Ransomware, in accordance with an embodiment of the present invention.

The analysis of the exemplary scenario shows that this cyber-attack originated from Chinese threat actors due to the following factors. Firstly, traces of the Earth Luscas cyber espionage gang family RAT were detected at the web server, which has historically targeted high-value entities such as government and educational institutions, religious movements, pro-democracy and human rights organizations across Asia, Covid-19 research organizations, and various media outlets.

Furthermore, aligning with Earth Luscas's behavior, cyber-attackers dropping Winnti backdoor were seen, which is often deployed as a secondary payload on the compromised web server. The cyber-attack also exhibited sophisticated Cobalt Strike traces, alongside extensive usage of BITS jobs on high-privileged user machine, suggesting a higher level of sophistication consistent with Chinese APT groups. Additionally, traces of the Redline info stealer were identified, which operates as a malware-as-a-service, aimed at extracting browser data, and saved credentials from victim machines. Notably, all cyber-attack origins trace back to Hong Kong-based IP addresses, despite being routed through VPN servers. The practice of using commercial VPN servers to conceal traces is a well-known strategy among Chinese APT threat actors. Lastly, following the payload downloads, the cyber-attackers employed Pandora ransomware to cover their tracks, a tactic consistent with prior Chinese cyber espionage campaigns.

TTPs Identified: T1190 (compromise webserver), T1059 (executed shell commands), T1036 (masquerading payload as cron.sh), T1078 (valid accounts for privilege escalation), T1105 (ingress tool transfer), T1021.002 (exploited SMB service), T1031 (BITS job created), T1003 (credential dumping using Readline steler), T1110 (bruteforce), T1486 (data encryption for impact).

Figure 12:
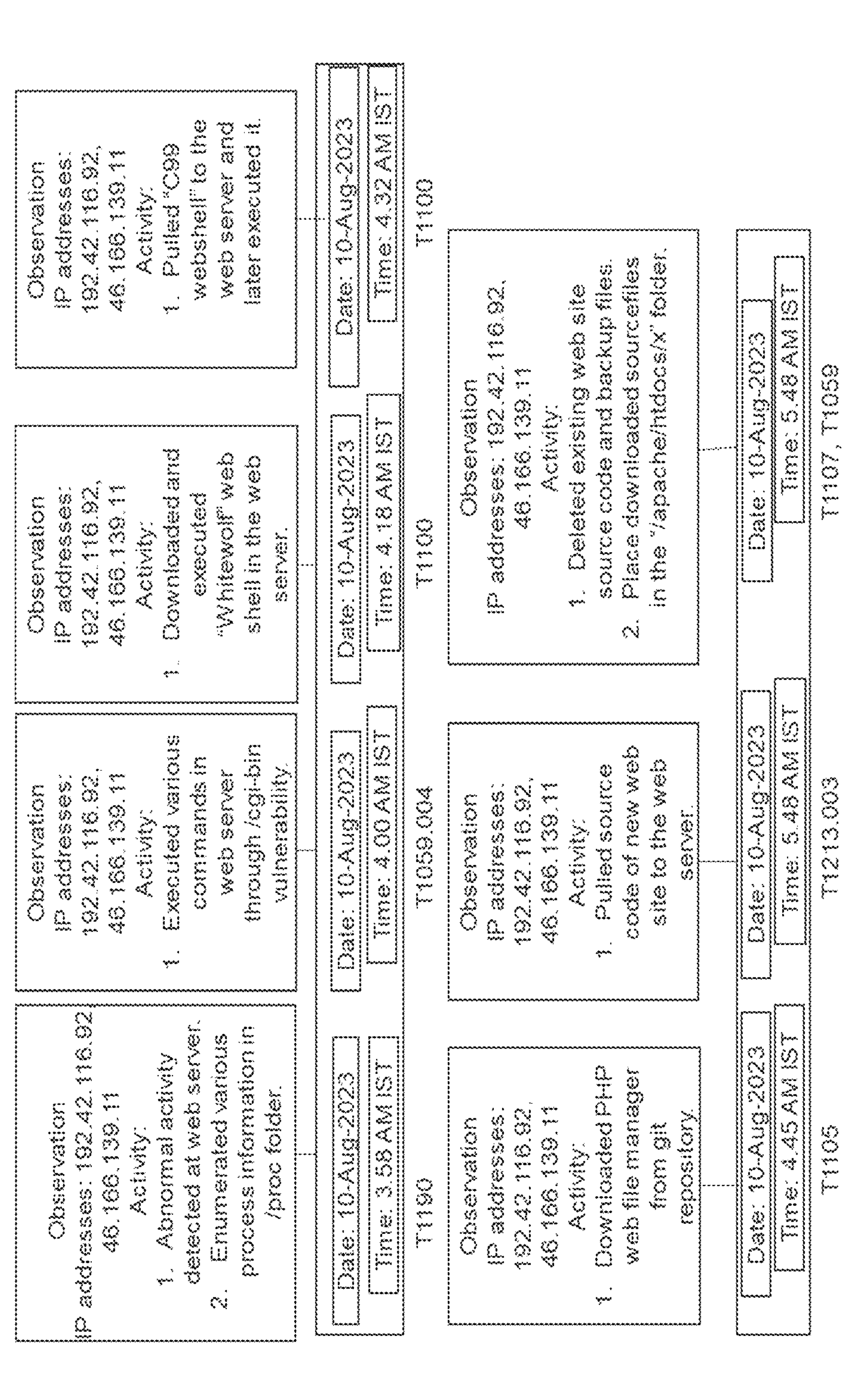
FIG. 12 illustrates an exemplary cyber-attack timeline for scenario 2, in accordance with an embodiment of the present invention.

FIG. 12 illustrates an exemplary cyber-attack timeline for Scenario-2, in accordance with an embodiment of the present invention.

The cyber-attack was traced back to Tor exit nodes located in Norway and Ukraine. However, a thorough analysis of internal logs and network traffic indicated that the cyber-attacker's origin was actually from the East Asian region. In this specific cyber-attack, the intruder's objectives involved compromising the web server, attempting to escalate privileges to gain root access, and deploying customized PHP webshells. Intriguingly, the cyber-attacker went on to erase both the backup and original website content from the/var/www directory, replacing it with a customized page displaying the Vietnamese flag and the statement "#Covid-DoesnotExist". A detailed breakdown of this cyber-attack's operations within the honeypot network is provided below.

In the orchestrated honeypot network, at 3:58 AM IST, the system detected anomalous activity on the web server. The cyber-attacker-initiated attempts to enumerate various process information within the "/proc" folder on the web server. By 4:00 AM IST on the same day, the cyber-attacker commenced executing diverse commands within the bash shell, leveraging an exploit of the cgi-bin vulnerability present in Apache 2.4.49 to achieve remote code execution.

Subsequently, the cyber-attacker aimed to access the/root and/proc directories on the web server. Due to the "httpdeamon" process operating without root privileges, these attempts were unsuccessful. The cyber-attacker also employed "wget" and "curl" to download payloads from external sources. Later the cyber-attacker executed a series of commands to elevate the privileges. At 4:18 AM IST, the cyber-attacker downloaded the White Wolf PHP webshell from the URL: https://pastebin.com/raw/Bph6NABy. Following this, a command was issued through malicious GET requests to execute the downloaded payload on the web server. Approximately at 4:32 AM IST, the cyber-attacker proceeded to download the sophisticated and widely used c99 web shell onto the web server. This shell furnishes the cyber-attackers with a comprehensive set of capabilities to manipulate compromised servers. The "C99" moniker derives from its common appearance as a file named "c99.php" when uploaded. Featuring a user-friendly interface, the c99 web shell empowers the cyber-attackers to execute commands, explore the file system, transfer files, and interact with databases. The cyber-attacker sourced the shell from a GitHub repository and executed it on the web server.

Furthermore, around 4:45 AM IST, the cyber-attacker downloaded a PHP web file manager from the GitHub repository: https://github.com/jcampbell1/simple-file-manager/blob/master/index.php. This script facilitated the creation of a basic web-based file manager, enabling users to manage files and directories within a specified directory on the web server.

Figure 13:
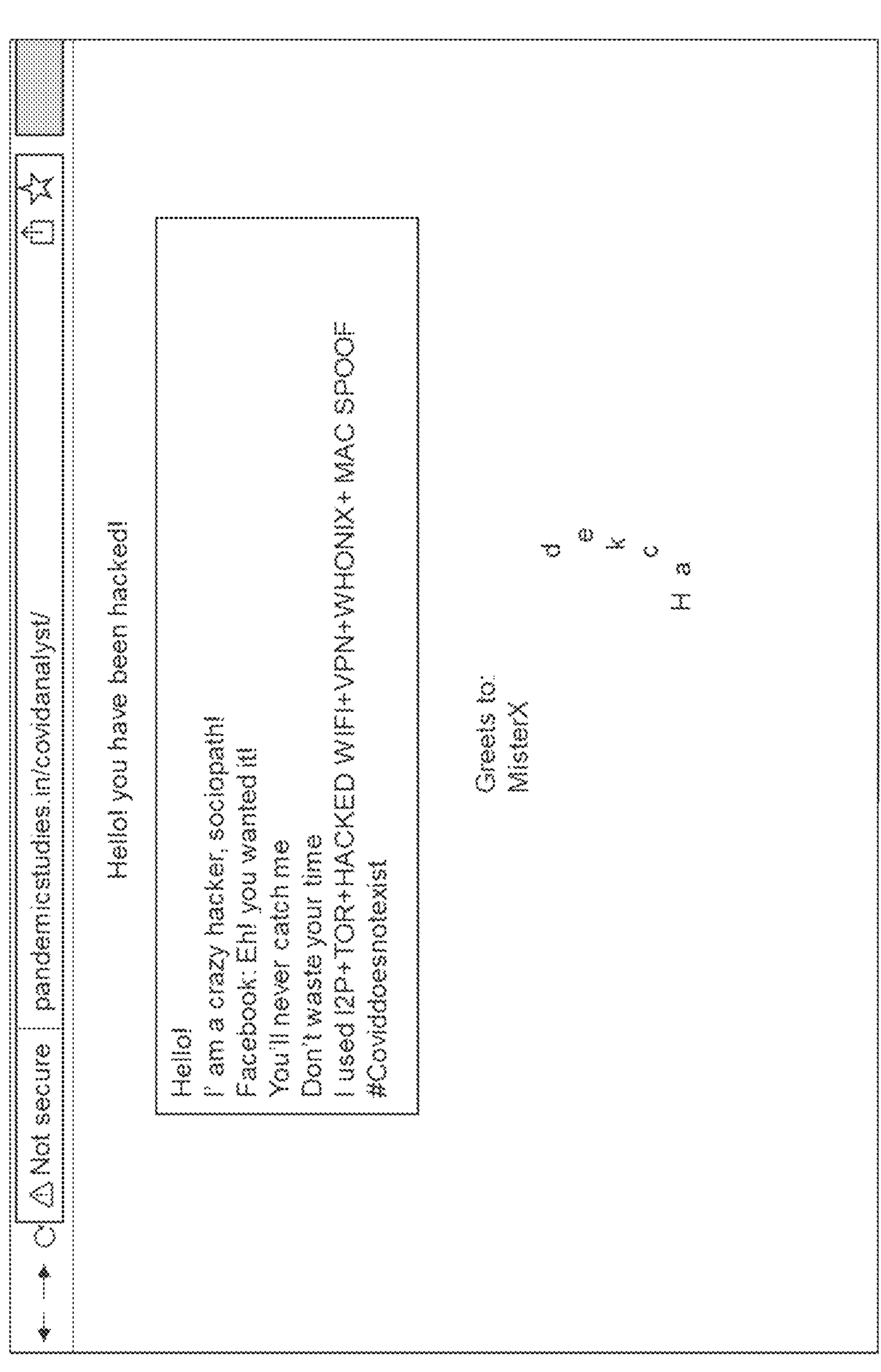
FIG. 13 illustrates an exemplary web-server in compromised state post the cyber-attack, in accordance with an embodiment of the present invention.

Subsequent to these actions, the cyber-attacker executed a sequence of commands from the bash shell, capitalizing on the cgi-bin vulnerability within the web server. Finally, at 5:48 AM IST, the cyber-attacker retrieved a new website from the URL:https://rentry.co/ihzrr/raw, followed by executing further commands through "/bin/sh" to delete an existing web page. The downloaded content was then placed in the "/usr/local/apache/htdocs/x" directory on the server. The webserver after compromise is shown in FIG. 13. The entire operation spanned approximately two hours.

FIG. 13 illustrates an exemplary web-server in compromised state post the cyber-attack, in accordance with an embodiment of the present invention.

A comprehensive examination of the website source code revealed additional insights, even though the cyber-attack was traced to a Tor node in Iceland (IPs 192.42.116.92 and 46.166.139.11) and the presence of the Vietnamese flag favicon on the cyber-attacker's pulled website. References to Korean pop songs within the commented-out sections and certain JavaScript functions written in Indonesian languages suggest that the cyber-attacker's origin likely lies in East Asian countries.

TTPs Identified: T1190 (compromising web server), T1100 (downloading web shell-white wolf), T1105 (remote file copy—PHP web file manager), T1107 (files and backup deletion at web server) and T1059 (executed shell commands to download payloads).

Figure 14:
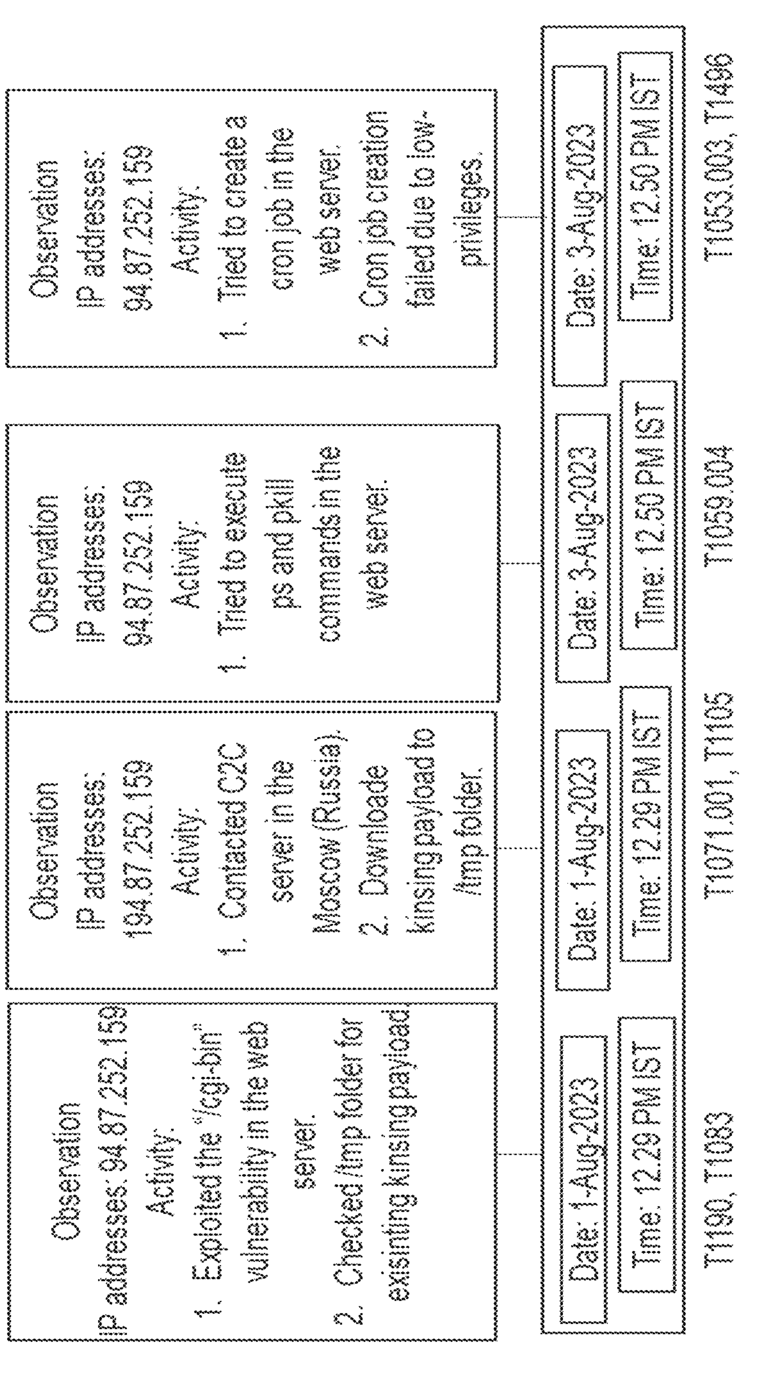
FIG. 14 illustrates an exemplary cyber-attack timeline for scenario 3, in accordance with an embodiment of the present invention.

FIG. 14 illustrates an exemplary cyber-attack timeline for Scenario-3, in accordance with an embodiment of the present invention.

In the honeypot network, presence of a crypto jacking worm known as Kinsing was detected by the system. This malware poses a severe threat to Linux-based systems, especially servers and cloud instances. Operating as a cryptocurrency mining botnet, it specifically targets vulnerable Linux servers, exploiting security weaknesses to gain unauthorized access for mining Monero (XMR) coins. TempKinsing employs various infection vectors, such as exploiting known vulnerabilities and weak credentials on exposed services like SSH and FTP, to gain initial access. To spread within the network, it uses lateral movement techniques and scans for open ports or unpatched services on other vulnerable systems. To evade detection and ensure its longevity on the compromised system, TempKinsing employs persistence and evasion techniques, including creating scheduled tasks and modifying system configurations, and using rootkit functionality and polymorphic code. Its primary objective is cryptocurrency mining, using the system's processing power without the owner's knowledge, resulting in reduced system performance and increased electricity consumption. To communicate with its C2 server covertly, TempKinsing establishes encrypted C2 communication. Kinsing previously used distinct configuration kits for each exploit, employed XMRig kits for Monero mining, and maintained persistence via cron jobs with hardcoded IP addresses. Its enhanced tactics make it challenging for defenders to detect and remove, including the capability to promptly eliminate infections from rival groups, demonstrating advanced self-cleaning and defence capabilities.

The operations of kinsing group observed in the honeypot network is given below.

In the orchestrated honeypot network, the system observed this crypto jacking worm activity at the external server. This was able to break the vulnerable Apache 2.4.49 server around 12:29 IST. Once it compromises the web server it searches for the existing kinsing trojan payload (elf) in the/tmp folder. Next the trojan connects to an external c2c server located in Moscow to pull the payload from the external C2C server to the compromised web server and saves it in a/tmp folder to achieve persistence.

Figure 15:
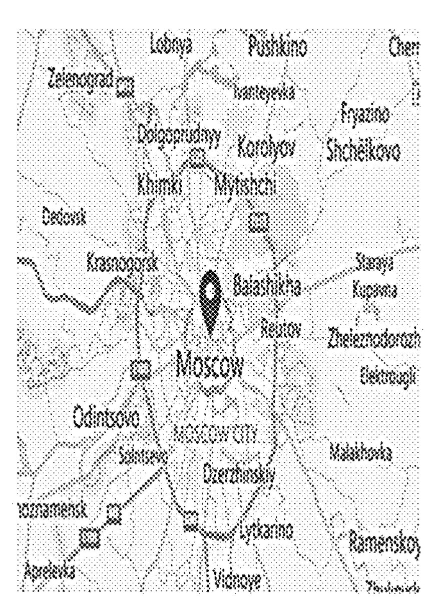
FIG. 15 illustrates an exemplary analysis of a Country to Country location of a tracked Kinsing malware.

FIG. 15 illustrates an exemplary analysis of a Country-to-Country location of a tracked kinsing malware, in accordance with an embodiment of the present invention.

Then the trojan verifies the downloaded payload in the/tmp folder and triggers the execution of the Monero crypto miner in the external web server. Once the miner payload is downloaded, it tried to create a cron job but as the exploited httpd daemon is running on a low privilege it failed to create a cron job to mine Monero in the machine. At the same time, the present invention has seen this trojan actively searching for ps, kill and pkill commands in the compromised machine as well which is in line with the trojan behavior specified in by the trendmicro research firm.

Kinsing Operations Captured in Our Honeypot:

| FILTERED DATA: http_logs | FILTERED DATA: http_logs |
|---|---|
| timestamp = 2023-08-01 12:34: 45.754018, | timestamp = 2023-08-03 13:00: 59.339781, |
| zone = httpserver-server | zone = httpserver-server |
| logline = /tmp/kinsingisb3039abf2ad5202f4a9363b418002351 | logline = no crontab for daemon |

| FILTERED DATA: http_logs | FILTERED DATA: http_logs |
|---|---|
| timestamp = 2023-08-03 12:50: 52.487841, | timestamp = 2023-08-03 12:50: 54.068140, |
| zone = httpserver-server | zone = httpserver-server |
| logline = main: line 277: ps: command not found | logline = main: line 291: pkill: command not found |

TTPs Identified: T1190 (compromised web server), T1071.001 (C2C communication), T1059.004 (command scripting-unix shell), T1105 (ingress tool transfer-payload download), T1083 (file and directory discovery) and T1053.003 (scheduled task/cronjob), T1496 (resource hijacking—failed to create crypto miner).

Figure 16A:
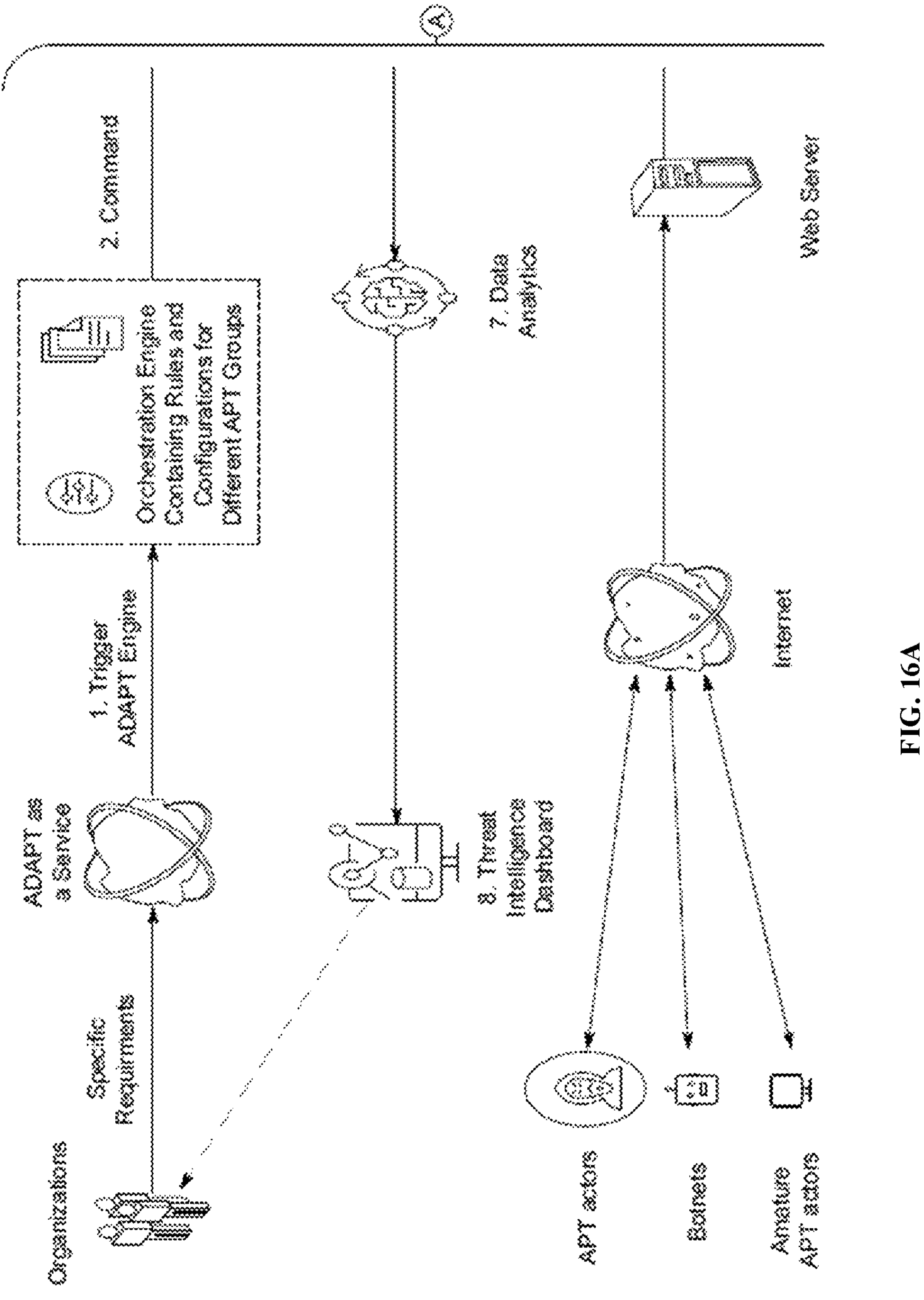
FIG. 16 illustrates "ADAPT" as a service, in accordance with an embodiment of the present invention.
Figure 16B:
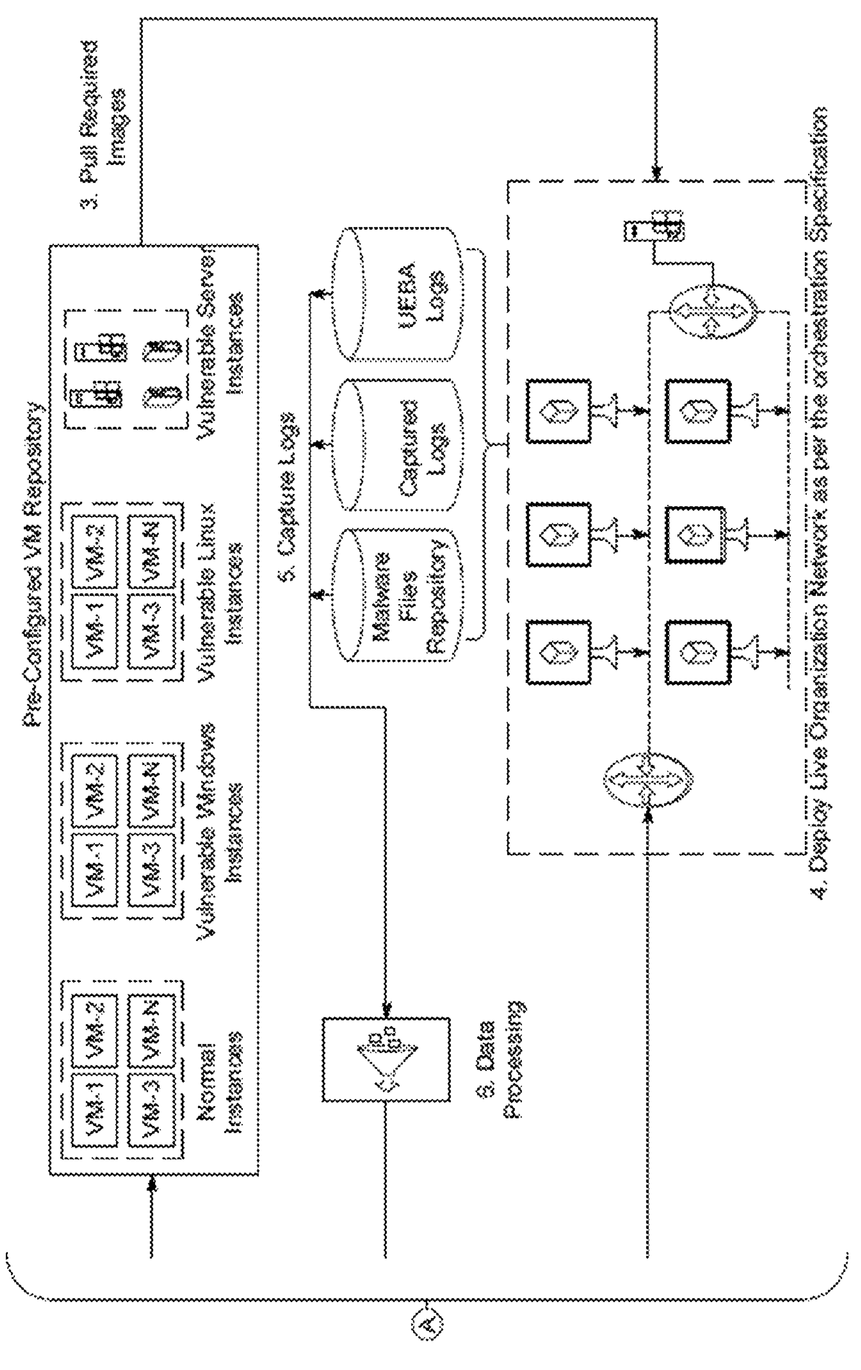

FIG. 16 illustrates ADAPT as a service, in accordance with an embodiment of the present invention.

Organizations first connect to ADAPT as a Service with specific requirements, such as the desired number of users in the live network, required services, the country they operate in, their organization's significance to potential malicious users, national importance, and the specific APT group orchestrations needed as a service. Once the organizations submit this crucial data, the orchestration engines, which contain the rules and metadata for orchestrating different APT group behaviours in live operating networks, are triggered.

Based on the information provided by the organizations or customers, the orchestration engine initiates a series of commands from the pre-configured VM repository. These commands pull the necessary set of vulnerable VMs, normal user machines, server images, and essential honeytokens required to engage potential malicious users, thereby creating a live operational network as shown in FIG. 16.

After the operating network is up and running, custom scripts trigger all the agents, active chatterbox configurations, and dedicated log collection engines through active camouflaging techniques. Following this, the scripts perform configuration verification and save the state of the entire operational network before exposing it to the external world. Subsequently, the live operation is strategically positioned within the IP range specific to the organization.

Once the live operating network is active, various malicious user activities may be observed, including botnets, amateur malicious users, and sophisticated threat actors. Bots might perform Distributed Denial of Service (DDoS) cyber-attacks, while amateur malicious users attempt a wide range of external web server compromises. In contrast, sophisticated threat actors target the web server to breach the internal network for exfiltrating sensitive data or sabotaging operations. The behaviour of malicious users is closely monitored using different sets of logs, and the data is pre-processed in near-real-time, providing visibility to organizations through a comprehensive dashboard. This empowers organizations with specific cyber-security related sensitive information, enabling them to observe the entire lifecycle of malicious users and their tactics closely, detect their presence, and better defend against future cyber-attacks by analysing their techniques, procedures, and tactics.

Figure 17:
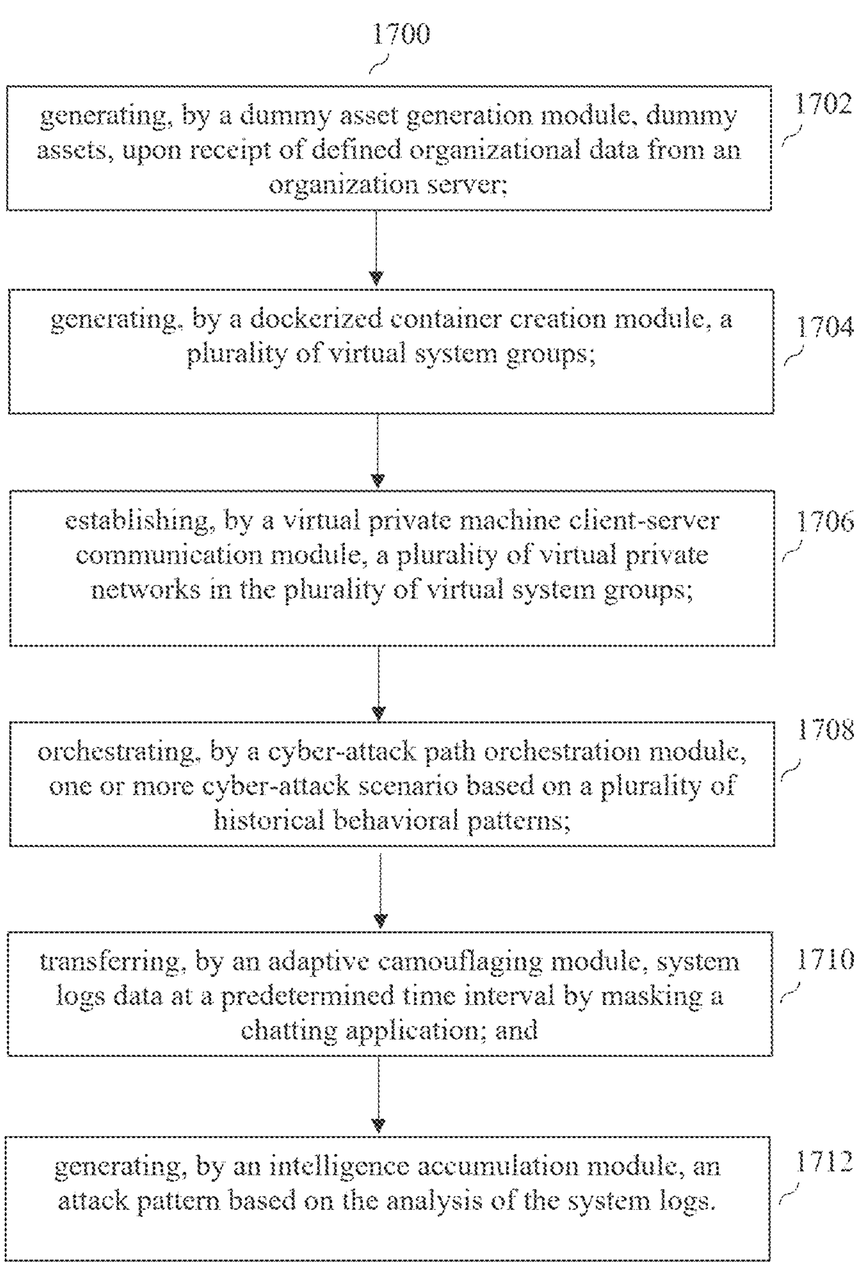
FIG. 17 illustrates a flow chart of a method for adaptive deception orchestration system, in accordance with an embodiment of the present invention.

FIG. 17 illustrates a flow chart of a method 1700 for adaptive deception orchestration system, in accordance with an embodiment of the present invention.

At step 1702, generating, dummy assets, upon receipt of defined organizational data from an organization server.

At step 1704, generating a plurality of virtual system groups.

At step 1706, establishing a plurality of virtual private networks in the plurality of virtual system groups to provide a secure communication channel.

At step 1708, orchestrating one or more cyber attack scenarios based on the plurality of historical behavioural patterns.

At step 1710, transferring, system logs data at a predetermined time interval by masking a chatting application.

At step 1712, generating, an attack pattern based on the analysis of the system logs data.

In yet another embodiment, In yet another embodiment, generating, by the dockerized container creation module, the plurality of virtual system groups, comprising receiving the defined organizational data from the organization server, generating a plurality of virtual system groups based on the received defined organizational data and masking the machine access control (MAC) address of the established virtual system groups.

In yet another embodiment, transferring, by the adaptive camouflaging module, system logs at the predetermined time interval by masking the chatting subsystem comprises transferring, by a periodic log transfer module, the system logs at a predetermined time interval and transferring the chat interactions to an external server at a predetermined time interval.

In yet another embodiment, generating an attack pattern based on analysis of the system logs and chat interactions data further comprises receiving, by an analyzing module, the system logs and data from the adaptive camouflaging module, analyzing the received system logs data for threat detection, creating, by a log creation module, log report based on user activities and mapping, by a correlation mapping module, correlations between system logs data and the detected threat, generating the attack pattern.

The present invention is significant as it provides full life cycle orchestration. Unlike conventional honeynets that typically attract the cyber-attackers with a single service, the orchestration enables attackers to experience a complete cyber-attack lifecycle. This means they can go beyond initial compromise and proceed to execute actions leading to data exfiltration. The comprehensive approach provides a rich and realistic environment for threat actors to operate, enhancing the quality of intelligence gathered.

The present invention is significant as it provides orchestration based on known threat actors' behavior. The approach to honeynet orchestration sets us apart from traditional honeynets in the effectiveness of enticing sophisticated cyber-attackers. By tailoring the live honeynet to mimic known cyber-attack behaviours observed by various threat groups, the present invention creates an intriguing environment for cyber-attackers. However, the present invention also ensures it is challenging for them to execute their operations. This strategic balance entices sophisticated threat actors to engage with the honeypot, enabling us to capture valuable insights throughout the entire cyber-attack lifecycle. The present invention is focused on orchestrating the cyber-attack paths inspired by the behaviours of three well known APT threat groups.

While the conventional approach did not precisely capture these APT groups within the honeypots, this approach yielded several noteworthy outcomes. Firstly, the orchestration of these cyber-attack paths significantly increased the cyber-attackers' interactions with the honeypots. Notably, during a campaign originating from Hong Kong, the cyber-attackers engaged with the honeypots for over 20 days, operating under the assumption that they had infiltrated a genuine operational network. Secondly, this orchestration allowed us to closely monitor the cyber-attackers' behavioural patterns throughout various life cycle phases and evaluate their sophistication levels. Additionally, the approach offers a high degree of customization. Organizations can tailor these cyber-attack paths to align with their unique geopolitical and national situations, as well as the specific types of the cyber-attackers they anticipate. This customization empowers organizations to gain valuable insights into cyber-attack campaigns that target their region, gather intelligence on the latest malware and cyber-attack trends, and identify frequently exploited TTPs and enticing cyber-attack paths. Such insights play a crucial role in bolstering the cyber resilience of organizations and aiding ongoing efforts in cyber-attack attribution.

The present invention is significant as it provides camouflaged apps for enhanced cyber security-related sensitive information. Sophisticated threat actors are well-versed in evading common security measures, making it difficult to observe their true behavior in traditional honeypot environments. In an innovative approach, the present invention has disguised the "chatterbox" app to resemble an internal chat application specific to the organization. This deceptive app regularly sends encrypted log updates to a different topic in the same Kafka broker. This camouflaged setup allows us to capture logs from every machine in the operational network without alerting the cyber-attackers. Consequently, the present invention can closely monitor the cyber-attacker's activity paths in near real-time and gain valuable insights into their behavior. Also, the honey network uses multiple layers of deception, including real user activity and MAC address masking, and employs the "chatterbox" application to gather intelligence covertly, reducing the risk of detection by the cyber-attackers and ensuring prolonged sensitive information capture.

The present invention designs, develops, and deploys a customized honeypot network, strategically crafted to ensnare the most sophisticated threat actors through active camouflaging techniques. The present invention focuses on designing and orchestrating behavioural honeypots specifically tailored for three well known APT groups. The methodology, of the present invention presents a practical solution for organizations to actively engage with sophisticated threat actors, effectively trace their cyber-attack paths, and align them with corresponding TTPs. This approach not only enhances the resilience of organizations but also empowers them to identify and harness organization-specific cyber-security based sensitive information. The ongoing efforts of the present invention are directed towards implementing ADAPT as a service, allowing for large-scale deployment tailored to the unique demands of diverse organizations. The present invention is committed to automating the deployment of live honeypot networks and developing comprehensive tracking, analysis, and TTP mapping capabilities to counteract cyber-attacks directed at the honeypot infrastructure.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and is not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A system for adaptive deception orchestration, the system comprising:
- one or more hardware processors; and
- a memory coupled to the one or more hardware processors, wherein the memory comprises a plurality of modules executable by the one or more hardware processors, and wherein the plurality of modules comprises:
  - a dummy asset generation module configured for generating dummy assets upon receipt of defined organizational data from an organization server;
  - a dockerized container creation module configured for generating a plurality of virtual system groups;
  - a virtual private machine client-server communication module configured for establishing a plurality of virtual private networks (VPN) in the plurality of virtual system groups, to provide a secure communication channel;
  - a cyber-attack path orchestration module configured for orchestrating one or more cyber-attack scenario based on a plurality of historical behavioural patterns;
  - an adaptive camouflaging module operatively configured for transferring system logs at a predetermined time interval by deploying a camouflaged application that combines secure chat capabilities with the transfer of system logs, wherein the camouflaged application is configured to:
  - function as a conventional chat interface establishing end-to-end communication channels between different users and user groups within an orchestrated honeypot network through a broker, and
    - operate as an unobtrusive log-transport mechanism facilitating periodic transfer of system logs from client-side nodes to the broker hosted on a same internet protocol (IP) address as the chat application; and
  - an intelligence accumulation module operatively connected to the adaptive camouflaging module configured for generating an attack pattern based on the analysis of the system logs.

2. The system as claimed in claim 1, wherein the dockerized container creation module configured for generating the plurality of virtual system groups, comprises:
- receiving the defined organizational data from the organization server;
- generating a plurality of virtual system groups based on the received defined organizational data and
- masking machine access control (MAC) address of the generated virtual system groups.

3. The system as claimed in claim 1, wherein the intelligence accumulation module comprises:
- an analyzing module configured to:
  - receive the system logs from the adaptive camouflaging module; and
  - analyze the received system logs for threat detection;
- a log creation module configured to create a log report based on user activities; and
- a correlation mapping module configured to map correlations between system logs and the detected threat, for generating the attack pattern.

4. The system as claimed in claim 1, wherein the plurality of defined organizational data comprises at least one of a customization data and an organization internal data, wherein the customization data comprises at least one of:
- a required number of users data, a service type data, a country of operation data, and a specific advance persistent threat (APT) group data; and
- wherein the organization internal data comprises at least one of:
- a transactional data, customer data, employee data, financial data, operational data, market data, compliance and regulatory data, Intellectual Property data, security and access control data, strategic planning data.

5. The system as claimed in claim 1, wherein the plurality of historical behavioural pattern comprises of a historical threat detection report and a historical attack pattern detection report.

6. A method for adaptive deception orchestration, the method comprising:
- generating, by a dummy asset generation module, dummy assets, upon receipt of defined organizational data from an organization server;
- generating, by a dockerized container creation module, a plurality of virtual system groups;
- establishing, by a virtual private machine client-server communication module, a plurality of virtual private networks (VPN) in the plurality of virtual system groups, to provide a secure communication channel;
- orchestrating, by a cyber-attack path orchestration module, one or more cyber-attack scenario based on a plurality of historical behavioural patterns;
- transferring, by an adaptive camouflaging module, system logs at a predetermined time interval by deploying a camouflaged application that combines secure chat capabilities with the transfer of system logs;

establishing, by the adaptive camouflaging module, using the camouflaged application, end-to-end communication channels between different users and user groups within an orchestrated honeypot network through a broker; and facilitating, by the adaptive camouflaging module, using the camouflaged application, periodic transfer of system logs from client-side nodes to the broker hosted on a same internet protocol (IP) address as the chat application; and generating, by an intelligence accumulation module, an attack pattern based on the analysis of the system logs.

7. The method as claimed in claim 6, wherein generating, by the dockerized container creation module, the plurality of virtual system groups, comprising:

receiving the defined organizational data from the organization server;

generating a plurality of virtual system groups based on the received defined organizational data; and masking the machine access control (MAC) address of the established virtual system groups.

8. The method as claimed in claim 6, wherein generating, by an intelligence accumulation module, an attack pattern based on the analysis of the system logs, comprising:

receiving, by an analyzing module, the system logs from the adaptive camouflaging module;

analyzing the received system logs for threat detection;

creating, by a log creation module, log report based on user activities; and mapping, by a correlation mapping module, correlations between system logs and the detected threat, generating the attack pattern.

9. The method as claimed in claim 6, wherein the plurality of defined organizational data comprises at least one of a customization data and an organization internal data, wherein the customization data comprises at least one of:

a required number of users data, a service type data, a country of operation data, and a specific APT group data; and wherein the organization internal data comprises at least one of:

a transactional data, customer data, employee data, financial data, operational data, market data, compliance and regulatory data, Intellectual Property data, security and access control data, strategic planning data.

10. The method as claimed in claim 6, wherein the plurality of historical behavioural pattern comprises at least one of, a historical threat detection reports, and a historical attack pattern detection report.

11. A non-transitory computer readable storage medium having instructions stored therein that when executed by a hardware processor, cause the processor to execute operations of:

generating dummy assets, upon receipt of defined organizational data from an organization server;

generating a plurality of virtual system groups;

establishing a plurality of virtual private networks (VPN) in the plurality of virtual system groups, to provide a secure communication channel;

orchestrating one or more cyber-attack scenario based on a plurality of historical behavioural patterns;

transferring system logs at a predetermined time interval by a camouflaged application that combines secure chat capabilities with the transfer of system logs;

establishing, using the camouflaged application, end-to-end communication channels between different users and user groups within an orchestrated honeypot network through a broker; and facilitating, using the camouflaged application, periodic transfer of system logs from client-side nodes to the broker hosted on a same internet protocol (IP) address as the chat application; and generating an attack pattern based on the analysis of the system logs.

* * * * *